(12) United States Patent
Miyauchi et al.

(10) Patent No.: US 11,095,790 B2
(45) Date of Patent: Aug. 17, 2021

(54) IMAGE READING APPARATUS AND IMAGE READING SYSTEM

(71) Applicant: SEIKO EPSON CORPORATION, Tokyo (JP)

(72) Inventors: Keisuke Miyauchi, Kitakyushu (JP); Tsuyoshi Yamanaka, Kitakyushu (JP); Shinsuke Kogi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/173,936

(22) Filed: Oct. 29, 2018

(65) Prior Publication Data

US 2019/0132464 A1     May 2, 2019

(30) Foreign Application Priority Data

Oct. 31, 2017  (JP) .............................. JP2017-210114

(51) Int. Cl.
*H04N 1/00* (2006.01)
*H04N 1/04* (2006.01)

(52) U.S. Cl.
CPC ..... *H04N 1/00798* (2013.01); *H04N 1/00602* (2013.01); *H04N 1/00612* (2013.01); *H04N 1/00615* (2013.01); *H04N 1/00628* (2013.01)

(58) Field of Classification Search
None
See application file for complete search history.

(56) References Cited

U.S. PATENT DOCUMENTS

| 5,324,018 A * | 6/1994 | Miura ...................... B65H 1/08 271/109 |
| 6,408,161 B1 * | 6/2002 | Minowa ............. H04N 1/00519 399/380 |
| 6,462,839 B1 * | 10/2002 | Short .................. H04N 1/00538 358/401 |
| 6,744,537 B1 * | 6/2004 | Chiba ................ H04N 1/00687 358/404 |
| 6,854,843 B2 | 2/2005 | Anami et al. |
| 7,281,791 B2 | 10/2007 | Anami et al. |
| 7,614,739 B2 | 11/2009 | Anami et al. |
| 9,694,998 B2 * | 7/2017 | Lee .................... H04N 1/00604 |

(Continued)

FOREIGN PATENT DOCUMENTS

| CN | 1483588 | 3/2004 |
| CN | 101127817 A | 2/2008 |

(Continued)

*Primary Examiner* — Beniyam Menberu
(74) *Attorney, Agent, or Firm* — Workman Nydegger

(57) ABSTRACT

An image reading apparatus includes an output tray that receives a medium which is output thereon; an output roller pair that outputs the medium onto the output tray; an output-tray posture switching portion that switches a posture of the output tray with respect to the apparatus body; and an output-direction switching portion that switches an output direction of the medium by using the output roller pair. The output roller pair includes an output driving roller, and an output driven roller that nips the medium between the output driven roller and the output driving roller and that follows the rotation of the output driving roller. The output-direction switching portion switches the output direction of the medium by displacing a rotation center of the output driven roller around a rotation center of the output driving roller.

9 Claims, 28 Drawing Sheets

(56) References Cited

U.S. PATENT DOCUMENTS

| | | | |
|---|---|---|---|
| 2004/0066444 A1 | 4/2004 | Anami et al. | |
| 2004/0130089 A1* | 7/2004 | Suzuki | B65H 3/44 |
| | | | 271/9.01 |
| 2005/0225622 A1 | 10/2005 | Anami et al. | |
| 2006/0082044 A1* | 4/2006 | Aida | B65H 1/04 |
| | | | 271/145 |
| 2006/0139701 A1* | 6/2006 | Kurokawa | H04N 1/00525 |
| | | | 358/474 |
| 2006/0261539 A1* | 11/2006 | Terada | G03G 15/6502 |
| | | | 271/162 |
| 2007/0188818 A1* | 8/2007 | Westcott | H04N 1/00525 |
| | | | 358/296 |
| 2008/0001343 A1 | 1/2008 | Kato et al. | |
| 2008/0198214 A1 | 8/2008 | Anami et al. | |
| 2010/0053701 A1* | 3/2010 | Yoshida | H04N 1/00535 |
| | | | 358/474 |
| 2010/0097667 A1* | 4/2010 | Ikeda | H04N 1/00562 |
| | | | 358/497 |
| 2012/0274995 A1* | 11/2012 | Westcott | H04N 1/1013 |
| | | | 358/498 |
| 2016/0017649 A1* | 1/2016 | Akahane | H04N 1/00519 |
| | | | 358/474 |
| 2017/0137241 A1* | 5/2017 | Okumura | B65H 3/06 |
| 2017/0137242 A1* | 5/2017 | Okumura | B65H 3/5238 |
| 2018/0194579 A1* | 7/2018 | Harada | B65H 3/0653 |
| 2018/0312351 A1* | 11/2018 | Yamada | B65H 31/02 |
| 2019/0086853 A1* | 3/2019 | Oshida | G03G 15/6514 |
| 2019/0132455 A1* | 5/2019 | Miyauchi | H04N 1/00535 |

FOREIGN PATENT DOCUMENTS

| | | | | |
|---|---|---|---|---|
| JP | 06009066 | * | 1/1994 | B65H 1/04 |
| JP | 2002-274738 A | | 9/2002 | |
| JP | 2007-076805 | | 3/2007 | |
| JP | 2008177699 | * | 7/2008 | H04N 1/00 |
| JP | 2009-065240 | | 3/2009 | |
| JP | 2009-527143 A | | 7/2009 | |
| JP | 2014-086819 A | | 5/2014 | |
| JP | WO2016056139 | | 4/2017 | |
| JP | 2017098951 | * | 6/2017 | H04N 1/00 |
| JP | 2017-178588 A | | 10/2017 | |

* cited by examiner

FIG. 6
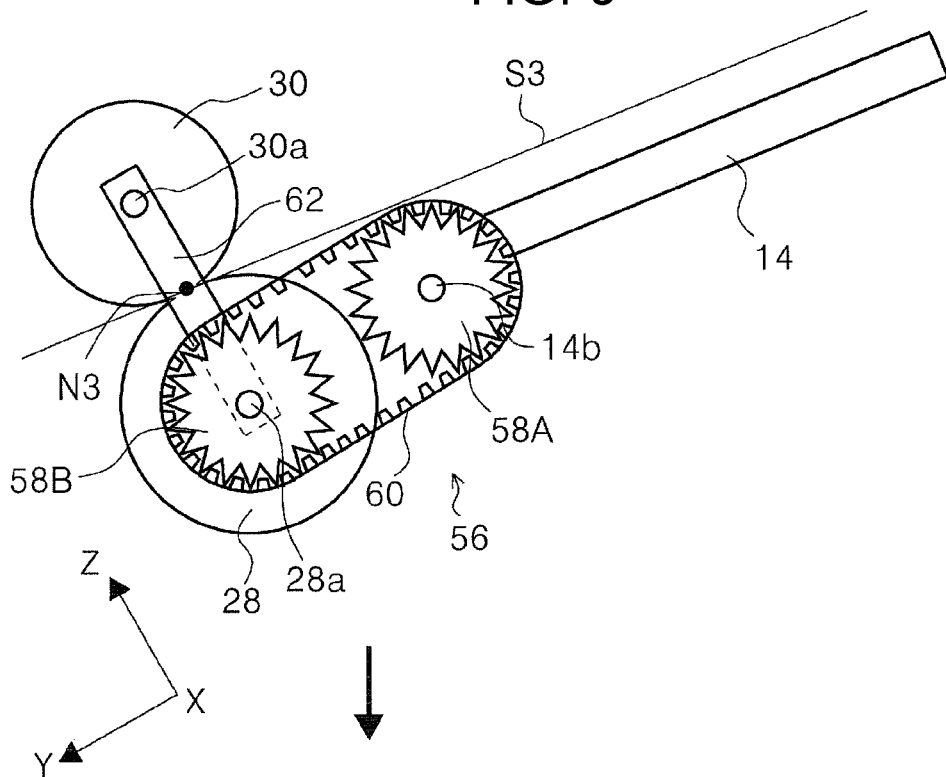
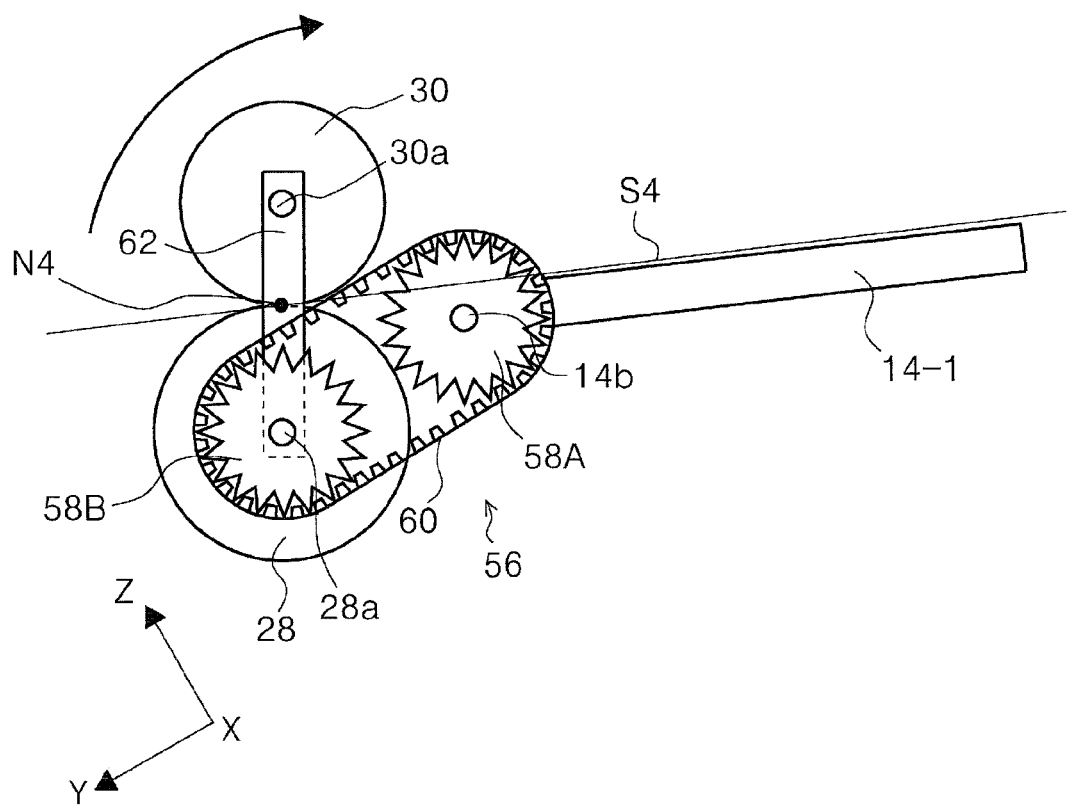

FIG. 20
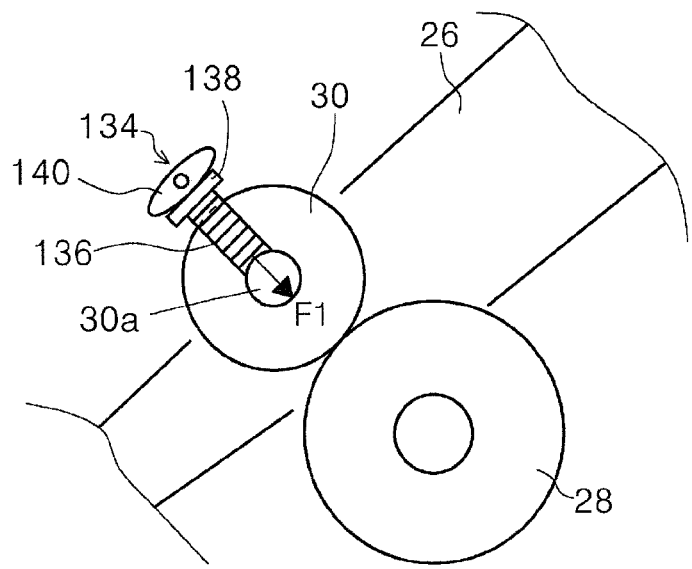
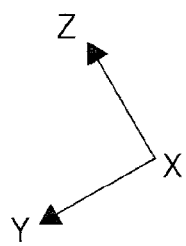
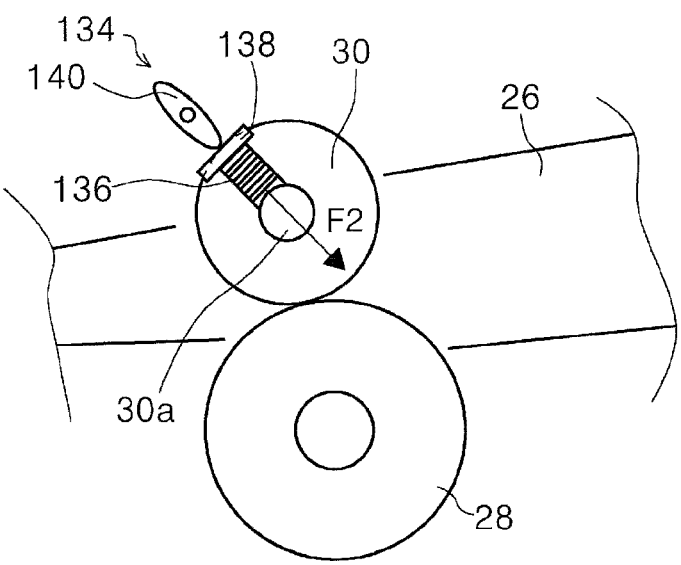
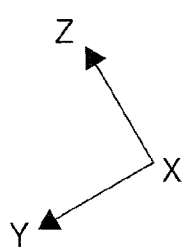

IMAGE READING APPARATUS AND IMAGE READING SYSTEM

BACKGROUND

1. Technical Field

The present invention relates to an image reading apparatus that reads a medium, and an image reading system including the image reading apparatus.

2. Related Art

A scanner is described below as an example of an image reading apparatus. A scanner may be provided with an auto document feeder (ADF) that automatically feeds a document which is an example of a medium, and automatically feed and read a plurality of documents.

In this case, the form of a document transport path largely affects the size of the installation space for the apparatus and transportability of documents. For example, if a feed tray that supports documents to be fed is tilted, the installation space for the apparatus can be smaller than that with a horizontal feed tray. Also, if the document transport path is entirely straight, a document with high rigidity can be properly transported.

An image reading apparatus described in JP-A-2014-86819 includes a first support portion that supports a casing in a first state in which a sheet transport path is tilted with respect to a horizontal direction, and a second support portion that supports the casing in a second state in which the sheet transport path is closer to the horizontal direction than the first state.

In the first state in which the casing is supported by the first support portion, the sheet transport path is tilted with respect to the horizontal direction, thereby suppressing an increase in size of the apparatus. Also, in the second state in which the casing is supported by the second support portion, the sheet transport path is closer to the horizontal direction than the first state, and an upper cover that receives a sheet to be output is in a posture substantially parallel to the sheet transport path. When a sheet with high resilience is output, the sheet may collide with the upper cover.

An image reading apparatus configured to change its installation posture as described above is known; however, there is still room for improvement in the following points. For a user who performs a series of works of setting a document on a feed tray and removing the document output on an output tray (corresponding to the upper cover in JP-A-2014-86819), for example, even when the posture of the apparatus is set with regard to ease of removal for the output document, the feed tray may not be always at a desirable angle.

Moreover, when the angle of the output tray is changed, stacking efficiency for documents on the output tray may be changed, and the documents may not be properly stacked on the output tray.

SUMMARY

An advantage of some aspects of the invention is to address at least one of the above problems.

According to a first aspect of the invention, there is provided an image reading apparatus including an apparatus body including a reader that reads a medium; an output tray that is provided at the apparatus body and that receives the medium which is output thereon; an output roller pair that outputs the medium onto the output tray; an output-tray posture switching portion that switches, independently from switching of a posture of the apparatus body with respect to a mount surface on which the apparatus body is mounted, a posture of the output tray with respect to the apparatus body; and an output-direction switching portion that switches an output direction of the medium by using the output roller pair.

With this aspect, since the image reading apparatus includes the output-tray posture switching portion that switches, independently from the switching of the posture of the apparatus body with respect to the mount surface on which the apparatus body is mounted, the posture of the output tray with respect to the apparatus body, the needs of the user of taking out a medium from the output tray can be more flexibly satisfied.

In addition, since the image reading apparatus includes the output roller pair that outputs the medium onto the output tray, and the output-direction switching portion that switches the output direction of the medium by using the output roller pair, even when the posture of the output tray with respect to the apparatus body is changed, stacking efficiency for media on the output tray can be properly maintained.

In this case, the output roller pair may include an output driving roller that is rotationally driven, and an output driven roller that nips the medium between the output driven roller and the output driving roller and that follows the rotation of the output driving roller; and the output-direction switching portion may switch the output direction of the medium by displacing a rotation center of the output driven roller around a rotation center of the output driving roller.

With this aspect, since the output-direction switching portion may switch the output direction of the medium by displacing the rotation center of the output driven roller around the rotation center of the output driving roller, the output-direction switching portion can reliably switch the output direction of the medium.

In this case, the output-direction switching portion may be provided downstream of the output roller pair, and switch the output direction of the medium by coming into contact with the medium and changing an advance direction of the medium.

With this aspect, since the output-direction switching portion may be provided downstream of the output roller pair, and switch the output direction of the medium by coming into contact with the medium and changing the advance direction of the medium, the output-direction switching portion can switch the output direction of the medium with a simple configuration.

In this case, the output-tray posture switching portion may switch the posture of the output tray and the output-direction switching portion may switch the output direction of the medium in association with the switching of the posture of the apparatus body.

With this aspect, since the output-tray posture switching portion may switch the posture of the output tray and the output-direction switching portion may switch the output direction of the medium in association with the switching of the posture of the apparatus body, the user does not have to manually switch the posture of the output tray and does not have to manually switch the output direction of the medium, and the image reading apparatus with high usability can be provided.

According to a second aspect of the invention, there is provided an image reading apparatus including an apparatus body including a reader that reads a medium; a feed tray that is provided at the apparatus body and that supports the medium which is set thereon; and a feed-tray posture switching portion that switches, independently from switching of a posture of the apparatus body with respect to a mount surface on which the apparatus body is mounted, a posture of the feed tray with respect to the mount surface.

With this aspect, since the image reading apparatus includes the feed-tray posture switching portion that switches, independently from the switching of the posture of the apparatus body with respect to the mount surface on which the apparatus body is mounted, the posture of the feed tray with respect to the mount surface, the needs of the user of setting a medium on the feed tray can be more flexibly satisfied.

In this case, the feed-tray posture switching portion may switch the posture of the feed tray in association with the switching of the posture of the apparatus body.

With this aspect, since the feed-tray posture switching portion may switch the posture of the feed tray in association with the switching of the posture of the apparatus body, the user does not have to manually switch the posture of the feed tray, and the image reading apparatus with high usability can be provided.

In this case, the image reading apparatus may further include a feed roller that sends the medium from the feed tray; a separation roller that nips the medium between the separation roller and the feed roller and hence that separates the medium; and a separation-roller displacing portion that displaces a rotation center of the separation roller around a rotation center of the feed roller.

With this aspect, since the image reading apparatus may include the separation-roller displacing portion that displaces the rotation center of the separation roller around the rotation center of the feed roller, even when the posture of the feed tray is changed with respect to the mount surface, separation efficiency for media by the separation roller can be properly maintained.

In this case, the feed-tray posture switching portion may switch the posture of the feed tray and the separation-roller displacing portion may displace the separation roller in association with the switching of the posture of the apparatus body.

With this aspect, since the feed-tray posture switching portion may switch the posture of the feed tray and the separation-roller displacing portion may displace the separation roller in association with the switching of the posture of the apparatus body, the user does not have to manually switch the posture of the feed tray and does not have to manually displace the separation roller, and the image reading apparatus with high usability can be provided.

According to a third aspect of the invention, there is provided an image reading apparatus including an apparatus body including a reader that reads a medium; and a feed tray that is provided at the apparatus body and that supports the medium which is set thereon. The apparatus body includes a tray attachment portion that allows the feed tray to be attached thereto and detached therefrom; and one of feed trays of a plurality of types with different forms is selectable in accordance with a change in posture of the apparatus body with respect to a mount surface on which the apparatus body is mounted.

With this aspect, since one of the feed trays of the plurality of types with the different forms is selectable in accordance with a change in posture of the apparatus body with respect to the mount surface on which the apparatus body is mounted, the needs of the user of setting a medium on the feed tray can be more flexibly satisfied.

According to a fourth aspect of the invention, there is provided an image reading system including an image reading apparatus including a tray attachment portion that allows a feed tray that supports a medium which is set thereon to be attachable to and detachable from an apparatus body including a reader that reads the medium; and a plurality of the feed trays that have different forms and that each are attachable to and detachable from the tray attachment portion. One of the feed trays of a plurality of types is selectable in accordance with a change in posture of the apparatus body with respect to a mount surface on which the apparatus body is mounted.

With this aspect, since one of the feed trays of the plurality of types is selectable in accordance with a change in posture of the apparatus body with respect to the mount surface on which the apparatus body is mounted, the needs of the user of setting a medium on the feed tray can be more flexibly satisfied.

In this case, the plurality of feed trays with the different forms may have different tilt angles with respect to the apparatus body.

With this aspect, since the plurality of feed trays with the different forms may have the different tilt angles with respect to the apparatus body, when the needs of the user who sets a medium on one of the feed trays are a change in posture of the feed tray, this configuration satisfies the needs.

In this case, the plurality of feed trays with the different forms may include a feed tray having a flat support surface that supports the medium.

With this aspect, since the plurality of feed trays with the different forms may include the feed tray having the flat support surface that supports the medium, a medium is not hooked to the feed tray when the medium is set on the feed tray.

In this case, the plurality of feed trays with the different forms may include a feed tray not provided with edge guides that guide side edges of the medium which is set on the feed tray.

With this aspect, since the plurality of feed trays with the different forms may include the feed tray not provided with the edge guides that guide the side edges of the medium which is set on the feed tray, a medium is not hooked to the edge guides when the medium is set on the feed tray.

In this case, the plurality of feed trays with the different forms may include a feed tray provided with edge guides that guide side edges of the medium which is set on the feed tray; and guide portions that constitute the edge guides and that restrict the side edges may be configured to be switched between a first state in which the guide portions restrict the side edges, and a second state in which the guide portions fall from the first state and protruding amounts of the guide portions from a support surface that supports the medium are decreased.

With this aspect, since the guide portions that constitute the edge guides and that restrict the side edges may be configured to be switched between the first state in which the guide portions restrict the side edges, and the second state in which the guide portions fall from the first state and the protruding amounts of the guide portions from the support surface that supports the medium are decreased, a medium is not hooked to the edge guides when the medium is set on the feed tray.

BRIEF DESCRIPTION OF THE DRAWINGS

The invention will be described with reference to the accompanying drawings, wherein like numbers reference like elements.

FIG. 6 provides schematic views explaining a feed-tray posture switching portion and a separation-roller displacing portion in the scanner according to the first embodiment.

FIG. 20 provides schematic views explaining a state in which the pressing force of a separation roller is adjusted in accordance with the posture of a feed tray in the scanner according to the seventh embodiment.

DESCRIPTION OF EXEMPLARY EMBODIMENTS

Embodiments of the invention are described below with reference to the drawings. The same reference signs are applied to the same configurations in the respective embodiments. Such a configuration is described only in the embodiment it appears first, and the description is omitted in the later embodiments.

Figure 1:
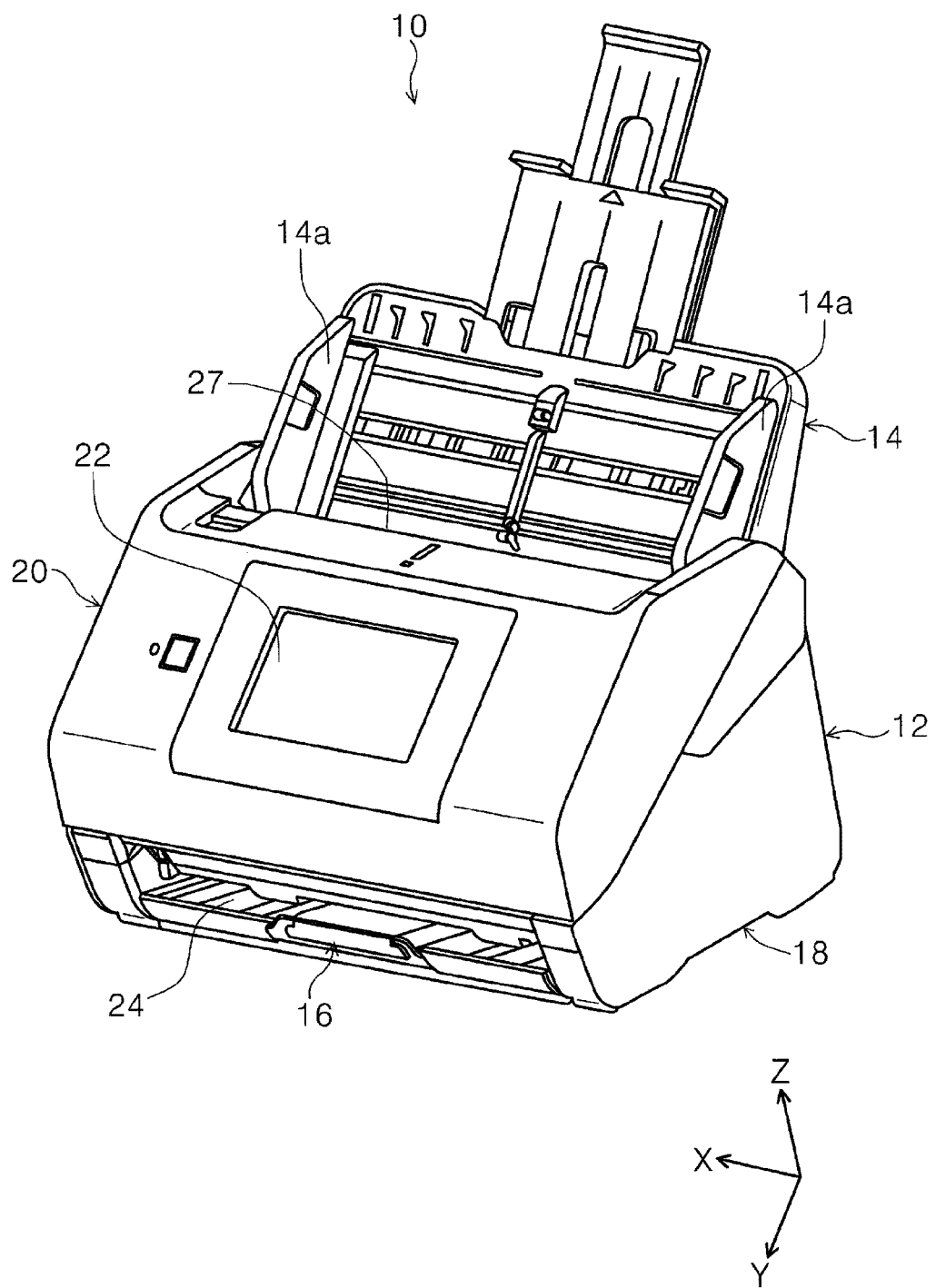
FIG. 1 is an external perspective view of a scanner for explaining the basic configuration of the scanner according to each embodiment.
Figure 2:
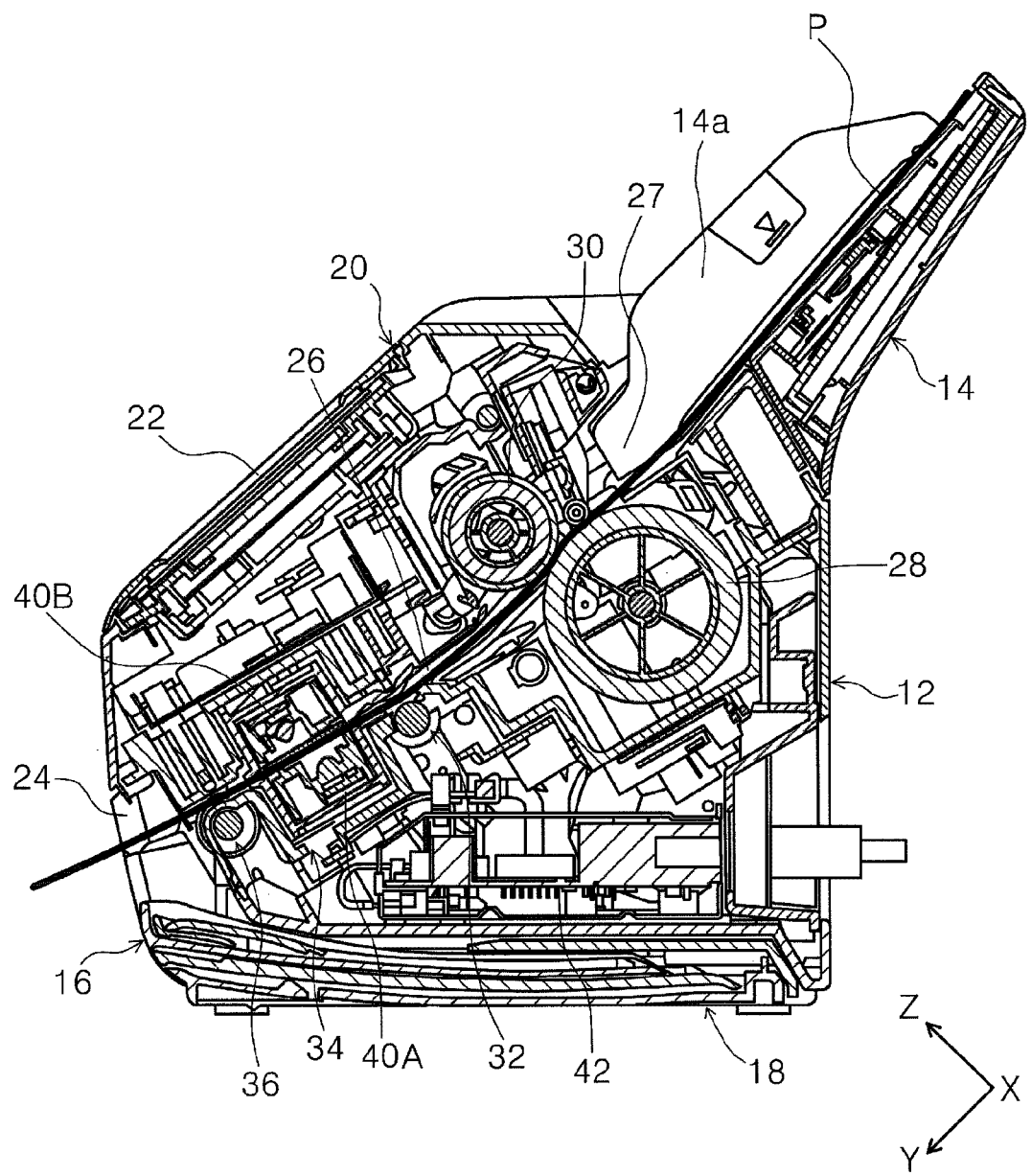
FIG. 2 is a side sectional view showing a medium feed path in the scanner.
Figure 3:
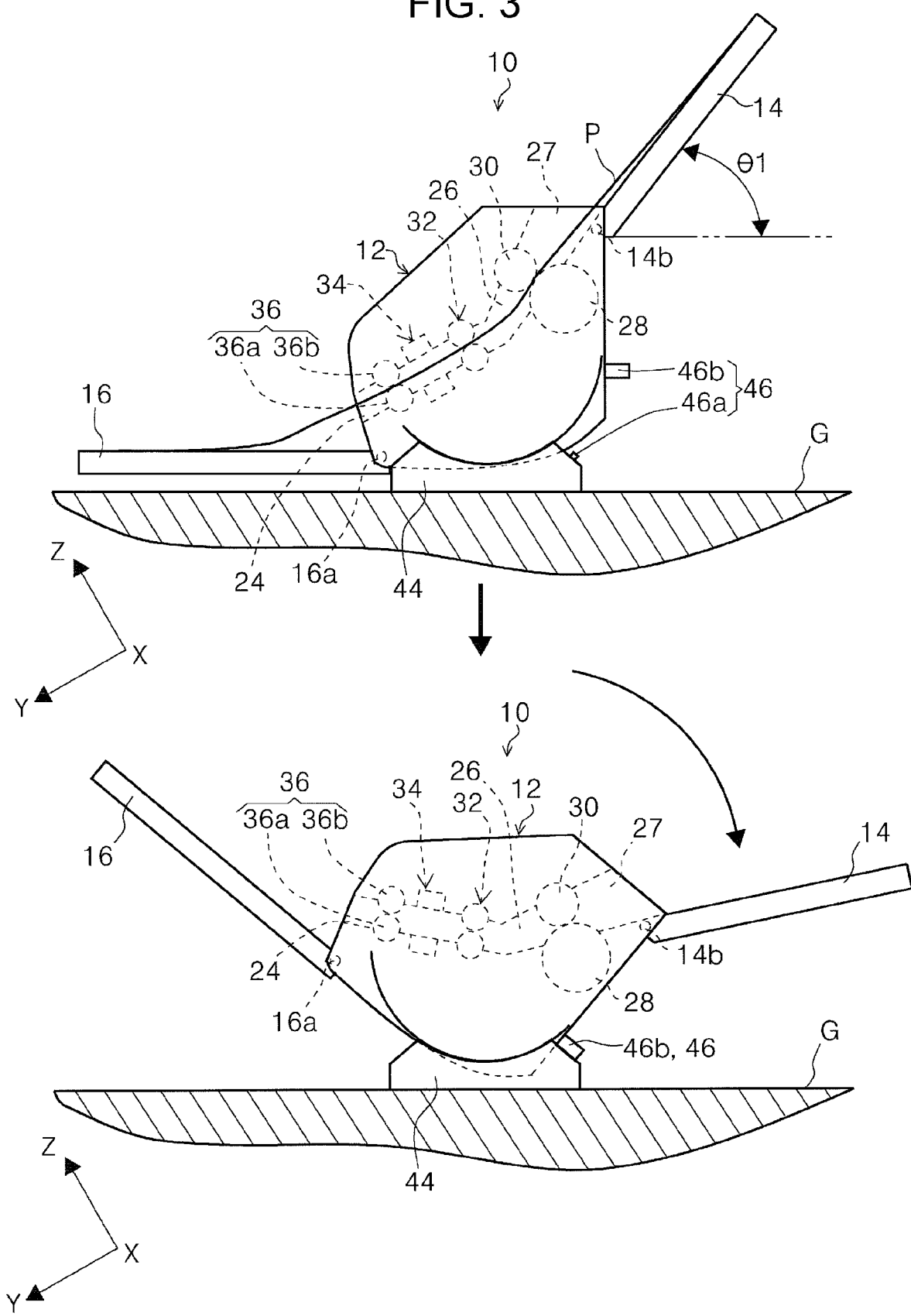
FIG. 3 provides schematic views showing switching from a first posture to a second posture of a scanner according to a first embodiment.
Figure 4:
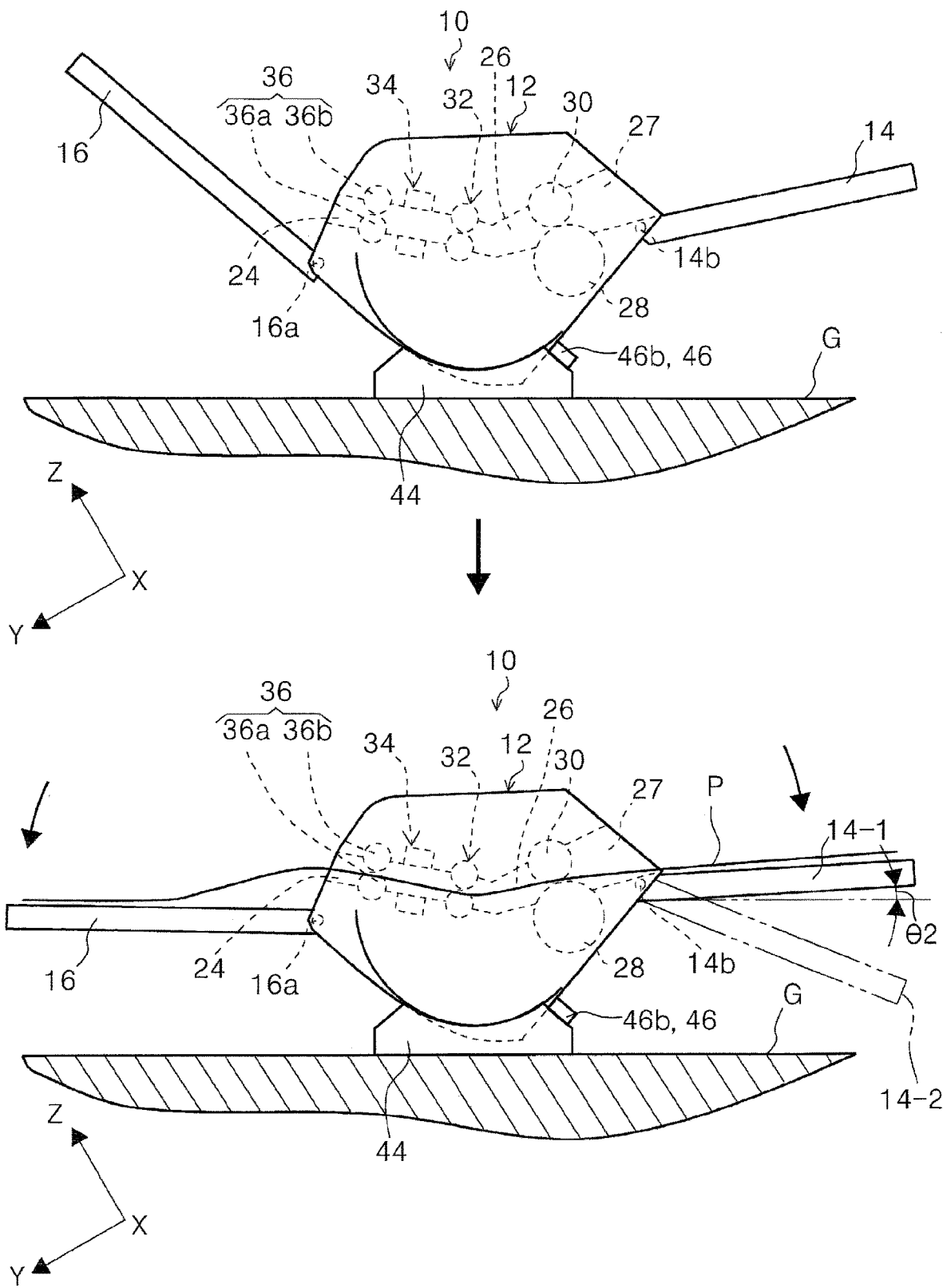
FIG. 4 provides schematic views explaining switching of the postures of a feed tray and an output tray when the scanner according to the first embodiment is in the second posture.

FIG. 1 is an external perspective view of a scanner for explaining the basic configuration of the scanner according to each embodiment; FIG. 2 is a side sectional view showing a medium feed path in the scanner; FIG. 3 provides schematic views showing switching from a first posture to a second posture of a scanner according to a first embodiment; and FIG. 4 provides schematic views explaining switching of the postures of a feed tray and an output tray when the scanner according to the first embodiment is in the second posture.

Figure 5:
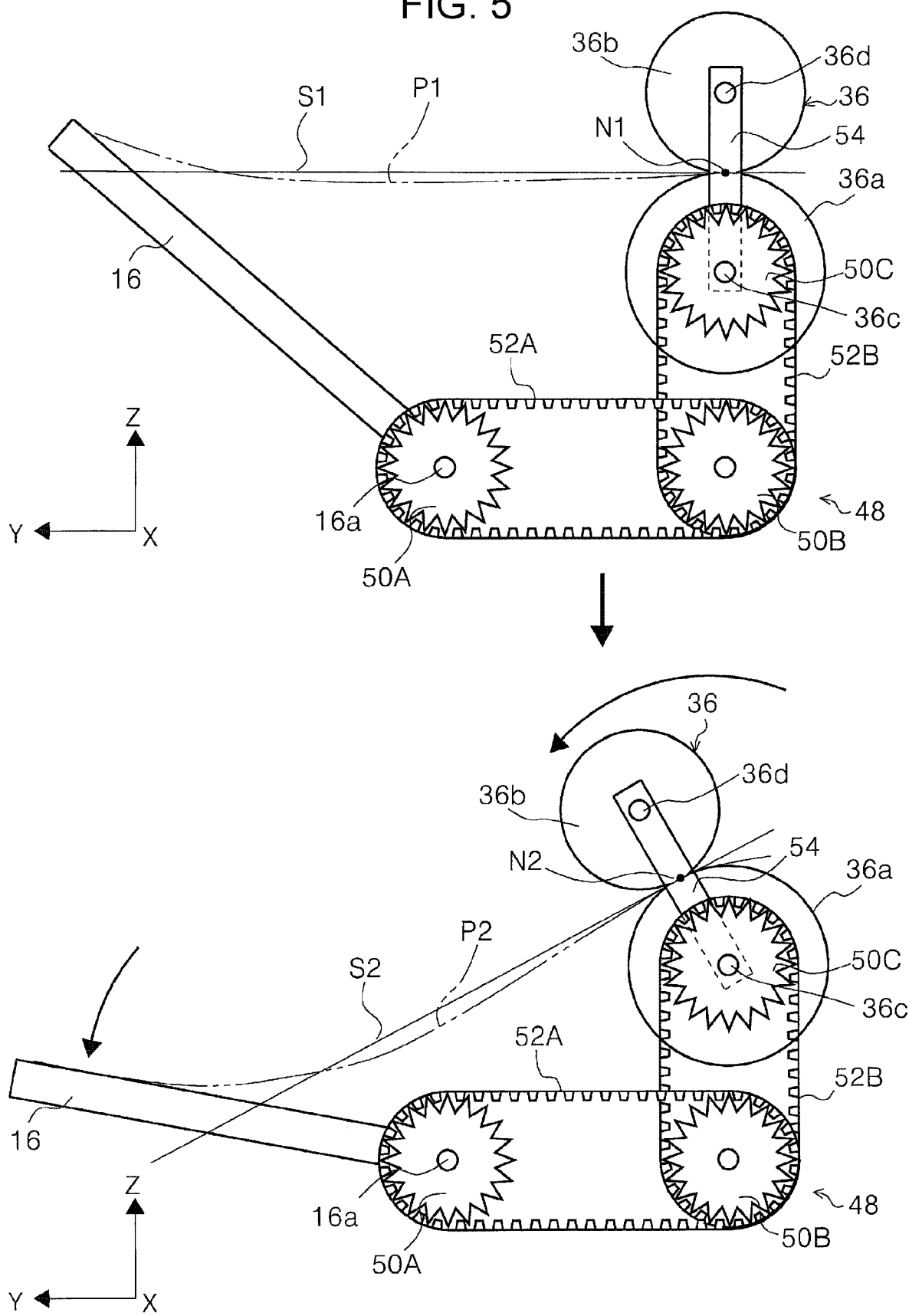
FIG. 5 provides schematic views explaining an output-tray posture switching portion and an output-direction switching portion in the scanner according to the first embodiment.
Figure 7:
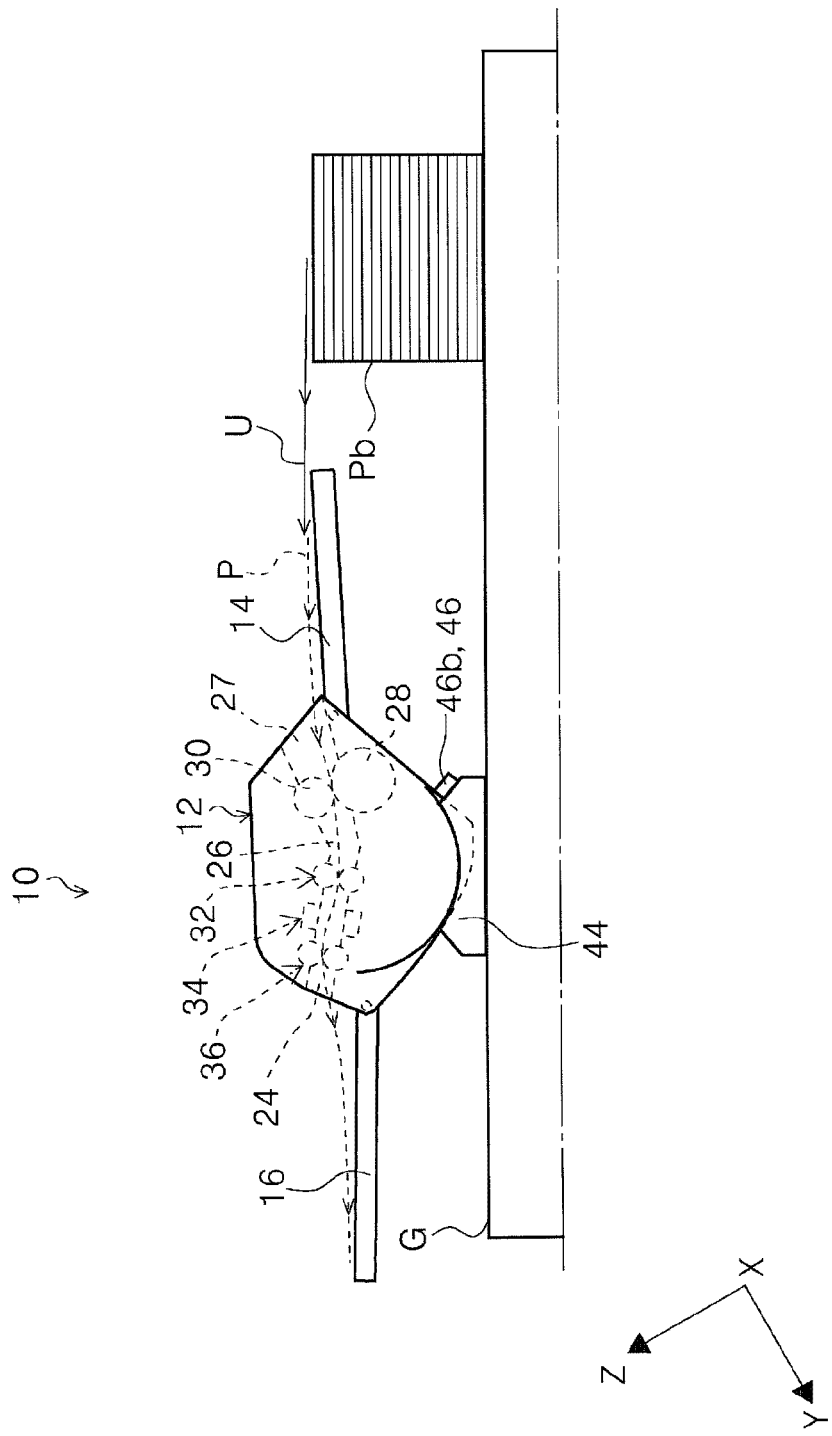
FIG. 7 is a schematic view showing a motion path of a hand of a user in the second posture according to the first embodiment.
Figure 8:
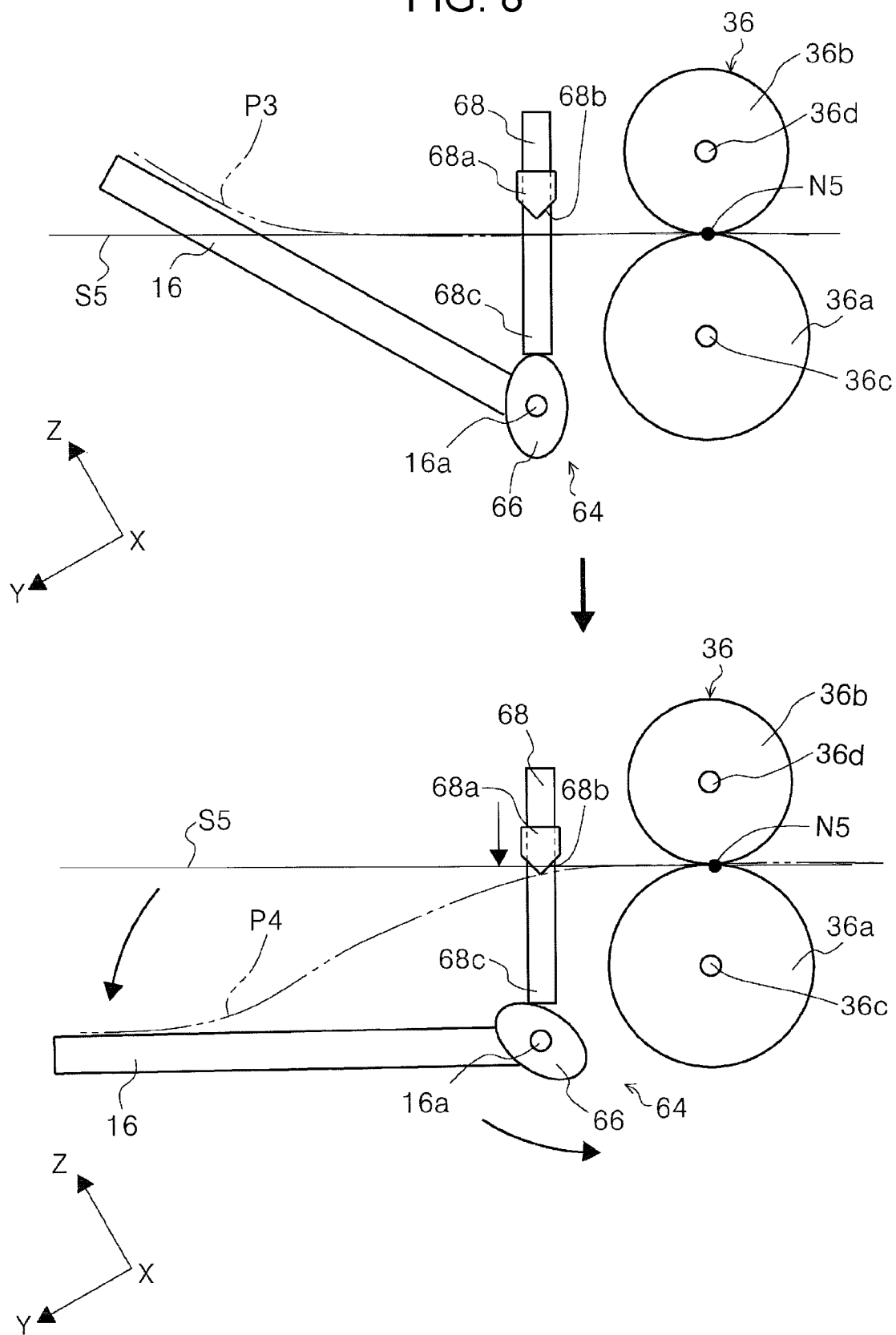
FIG. 8 provides schematic views showing an output-direction switching portion according to a second embodiment.

FIG. 5 provides schematic views explaining an output-tray posture switching portion and an output-direction switching portion in the scanner according to the first embodiment; FIG. 6 provides schematic views explaining a feed-tray posture switching portion and a separation-roller displacing portion in the scanner according to the first embodiment; FIG. 7 is a schematic view showing a motion path of a hand of a user in the second posture according to the first embodiment; and FIG. 8 provides schematic views showing an output-direction switching portion according to a second embodiment.

Figure 9:
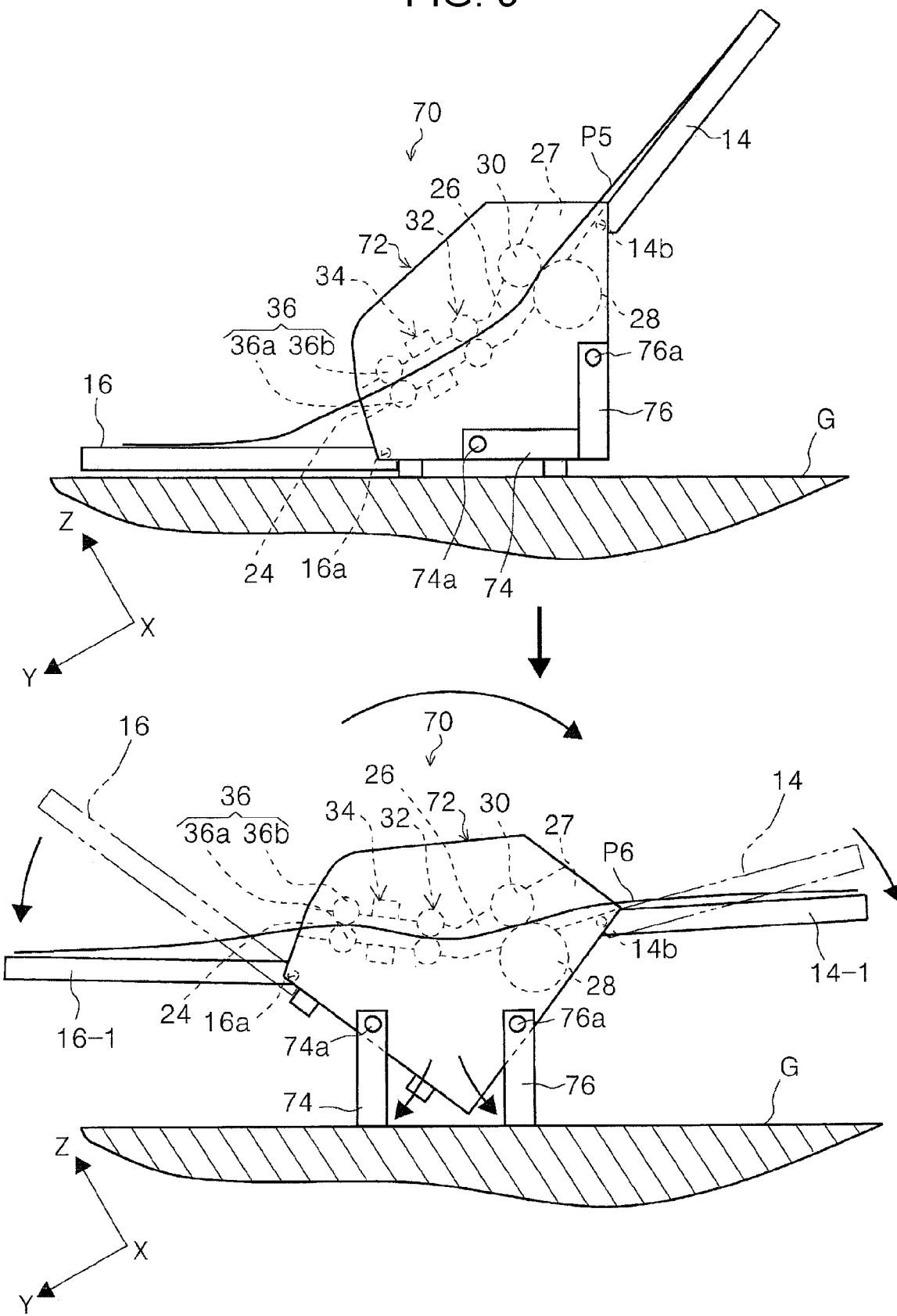
FIG. 9 provides schematic views showing switching from a first posture to a second posture of a scanner according to a third embodiment.
Figure 10:
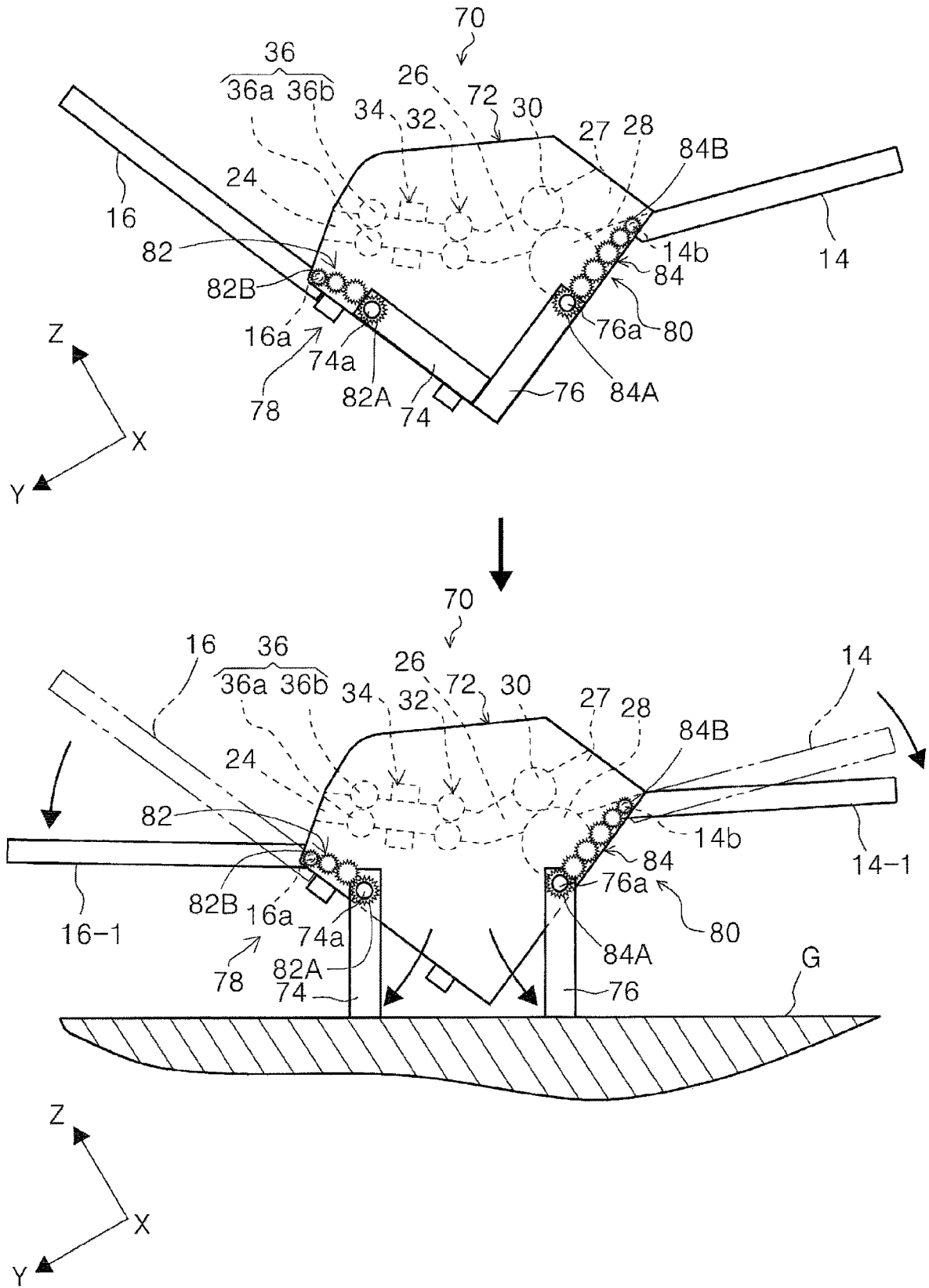
FIG. 10 provides schematic views explaining an output-tray posture switching portion and a feed-tray posture switching portion in the scanner according to the third embodiment.
Figure 11:
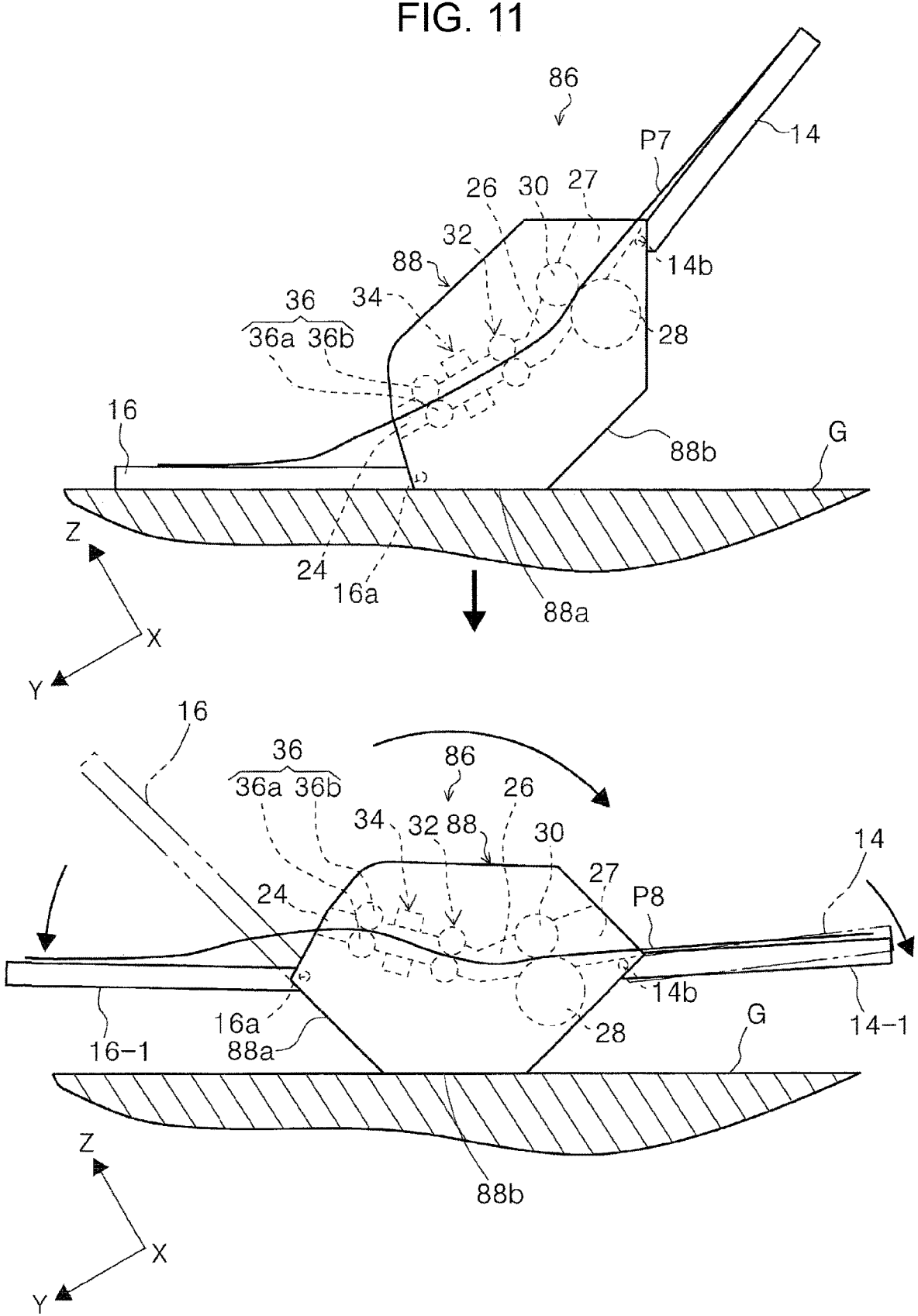
FIG. 11 provides schematic views showing switching from a first posture to a second posture of a scanner according to a fourth embodiment.
Figure 12:
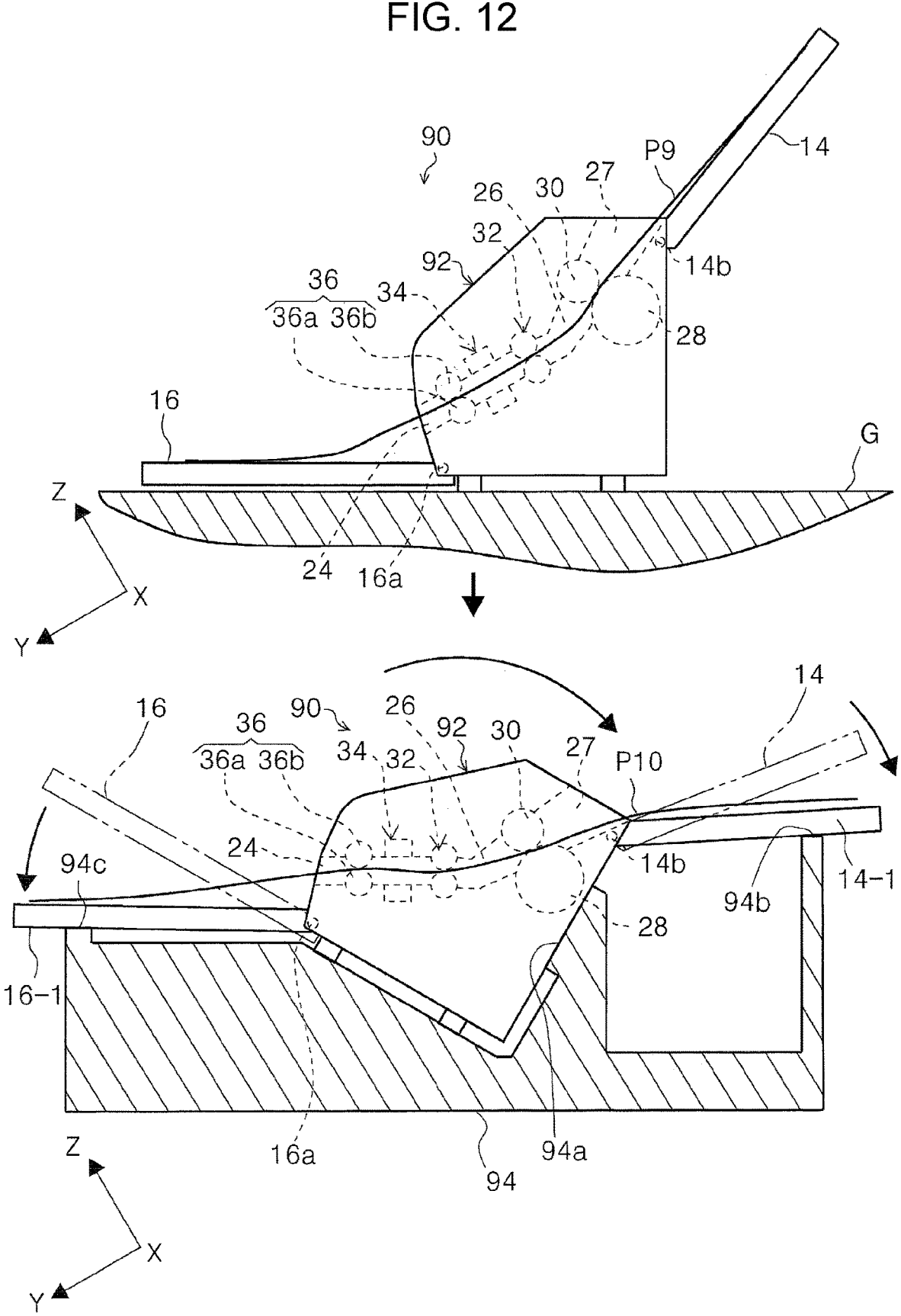
FIG. 12 provides schematic views showing switching from a first posture to a second posture of a scanner according to a fifth embodiment.

FIG. 9 provides schematic views showing switching from a first posture to a second posture of a scanner according to a third embodiment; FIG. 10 provides schematic views explaining an output-tray posture switching portion and a feed-tray posture switching portion in the scanner according to the third embodiment; FIG. 11 provides schematic views showing switching from a first posture to a second posture of a scanner according to a fourth embodiment; and FIG. 12 provides schematic views showing switching from a first posture to a second posture of a scanner according to a fifth embodiment.

Figure 13:
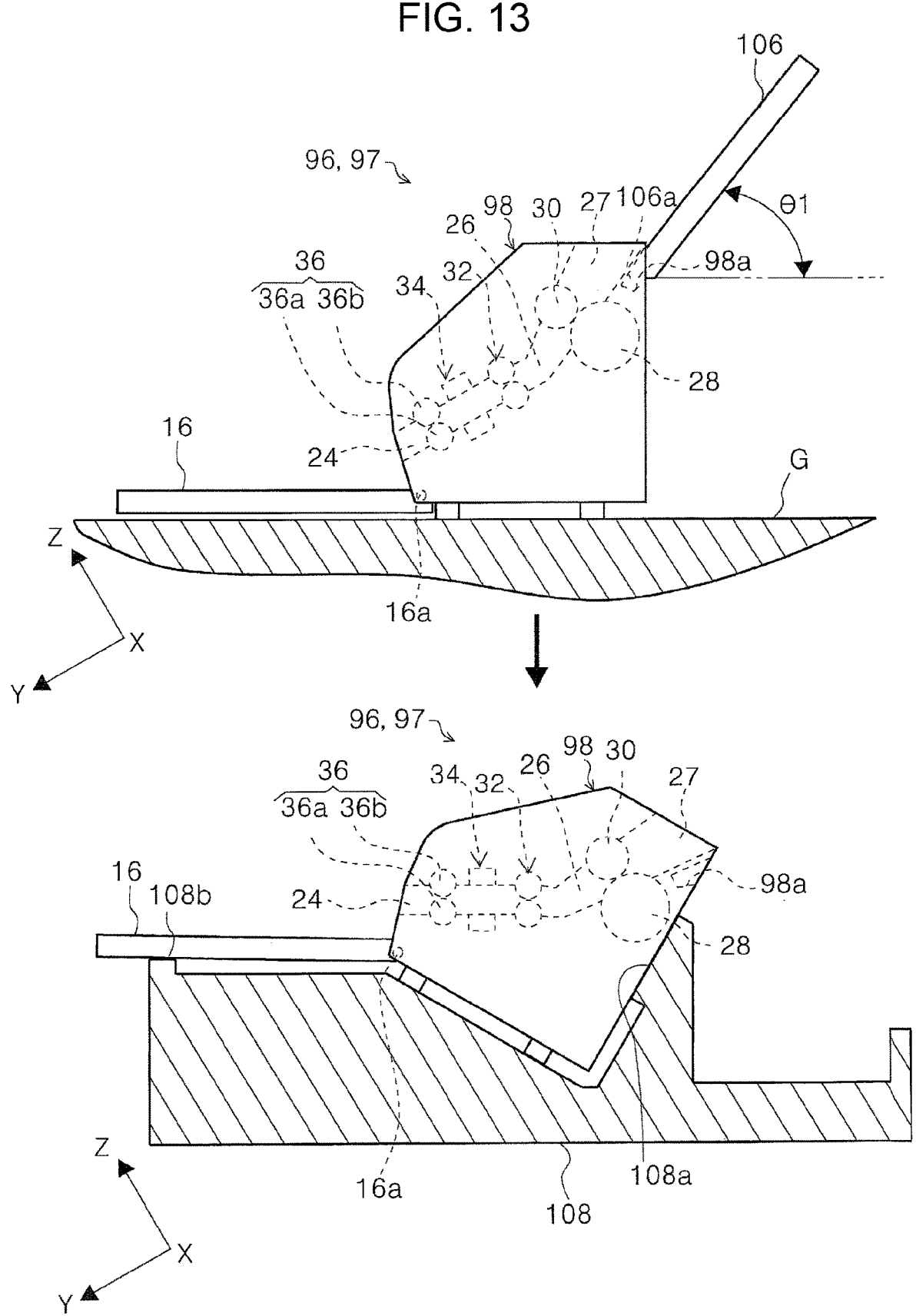
FIG. 13 provides schematic views showing a tray attachment portion of a scanner, and a first-posture feed tray attached to the tray attachment portion according to a sixth embodiment.
Figure 14:
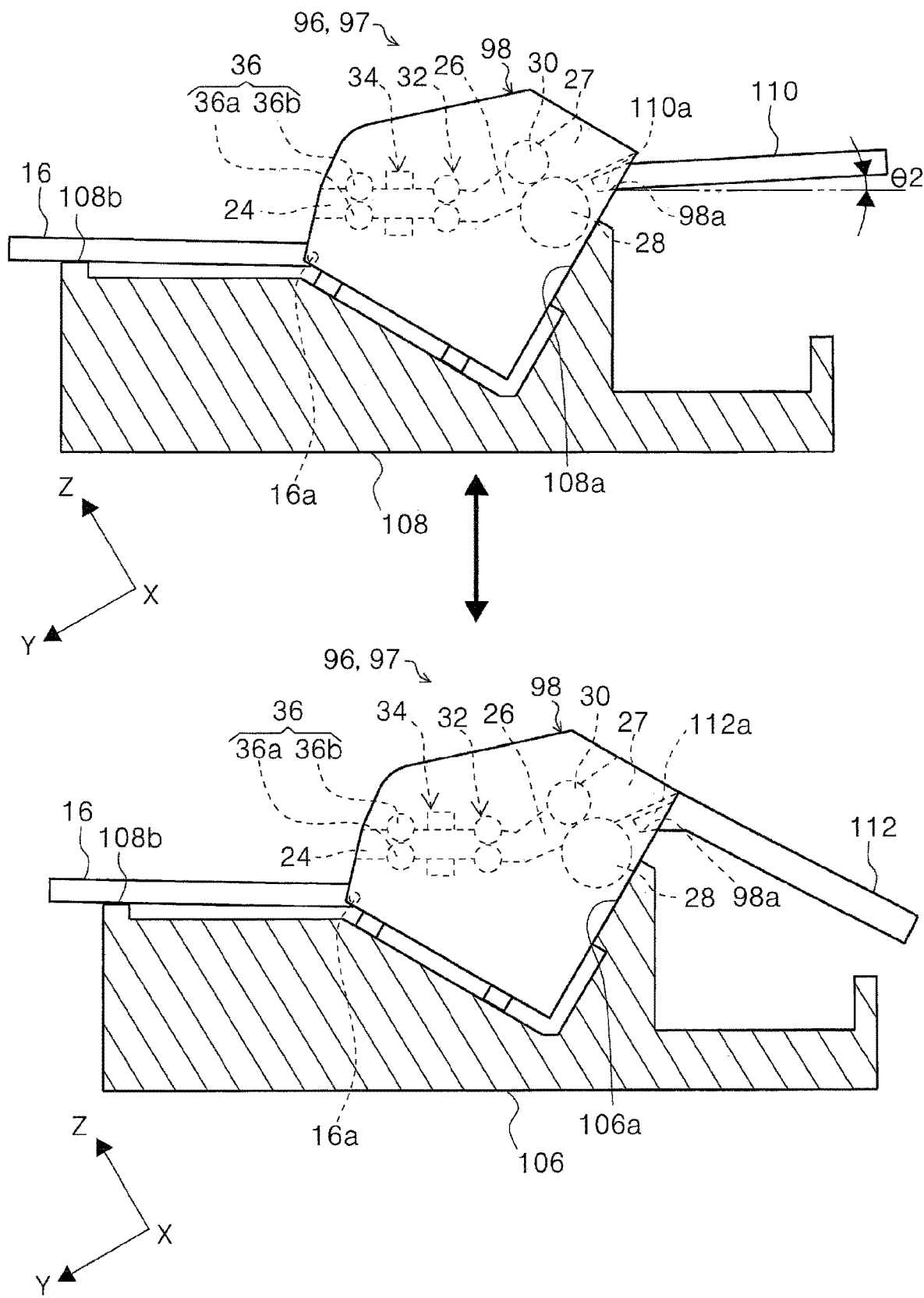
FIG. 14 provides schematic views explaining a state in which a second-posture feed tray is attached to the tray attachment portion of the scanner according to the sixth embodiment, and a state in which a long-medium feed tray is attached to the tray attachment portion.
Figure 15:
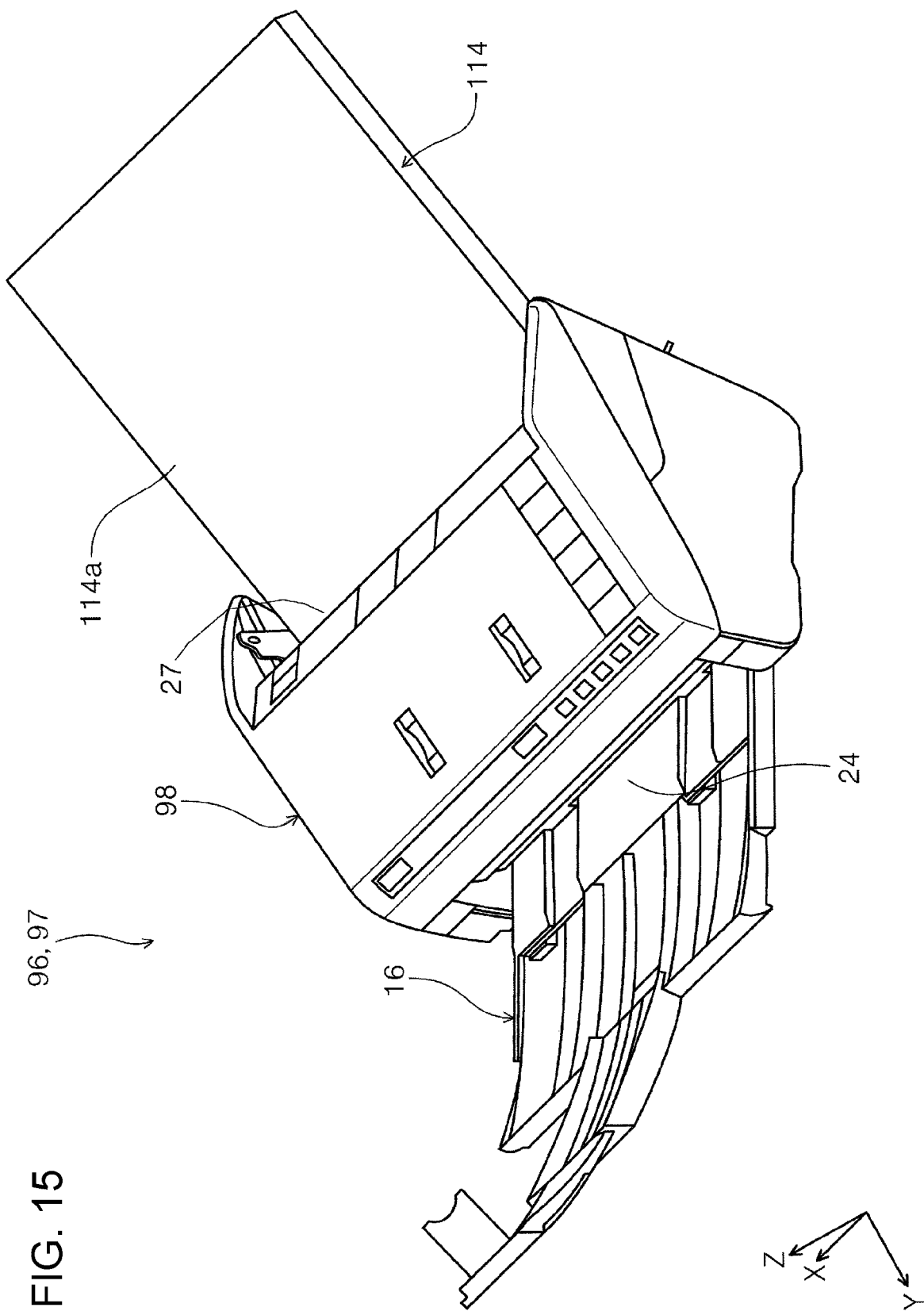
FIG. 15 is a perspective view showing a state in which a feed tray having a flat support surface for a medium is attached to the tray attachment portion of the scanner according to the sixth embodiment.
Figure 16:
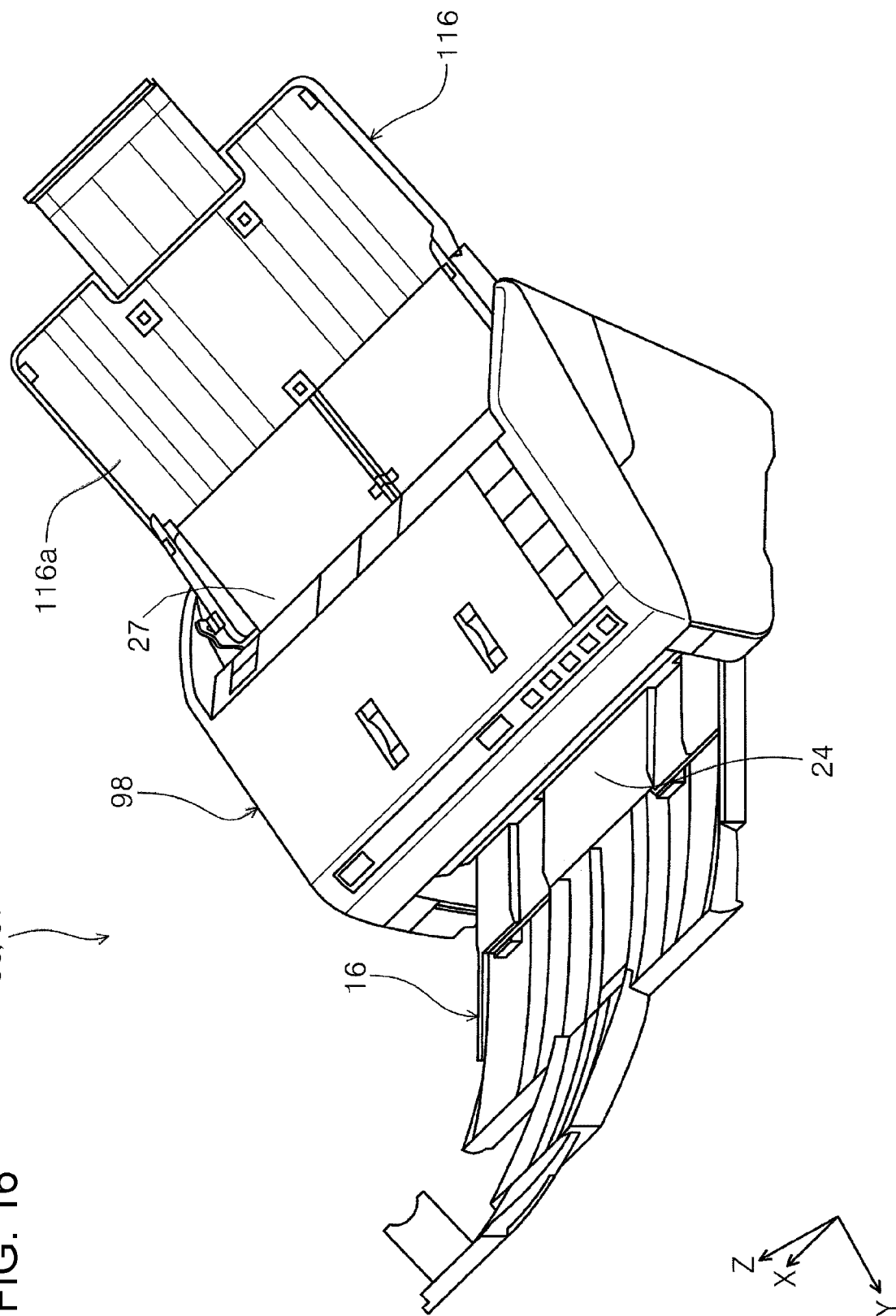
FIG. 16 is a perspective view showing a state in which a feed tray not provided with edge guides is attached to the tray attachment portion of the scanner according to the sixth embodiment.

FIG. 13 provides schematic views showing a tray attachment portion of a scanner, and a first-posture feed tray attached to the tray attachment portion according to a sixth embodiment; FIG. 14 provides schematic views showing a state in which a second-posture feed tray is attached to the tray attachment portion of the scanner according to the sixth embodiment, and a state in which a long-medium feed tray is attached to the tray attachment portion; FIG. 15 is a perspective view showing a state in which a feed tray having a flat support surface for a medium is attached to the tray attachment portion of the scanner according to the sixth embodiment; and FIG. 16 is a perspective view showing a state in which a feed tray not provided with edge guides is attached to the tray attachment portion of the scanner according to the sixth embodiment.

Figure 17:
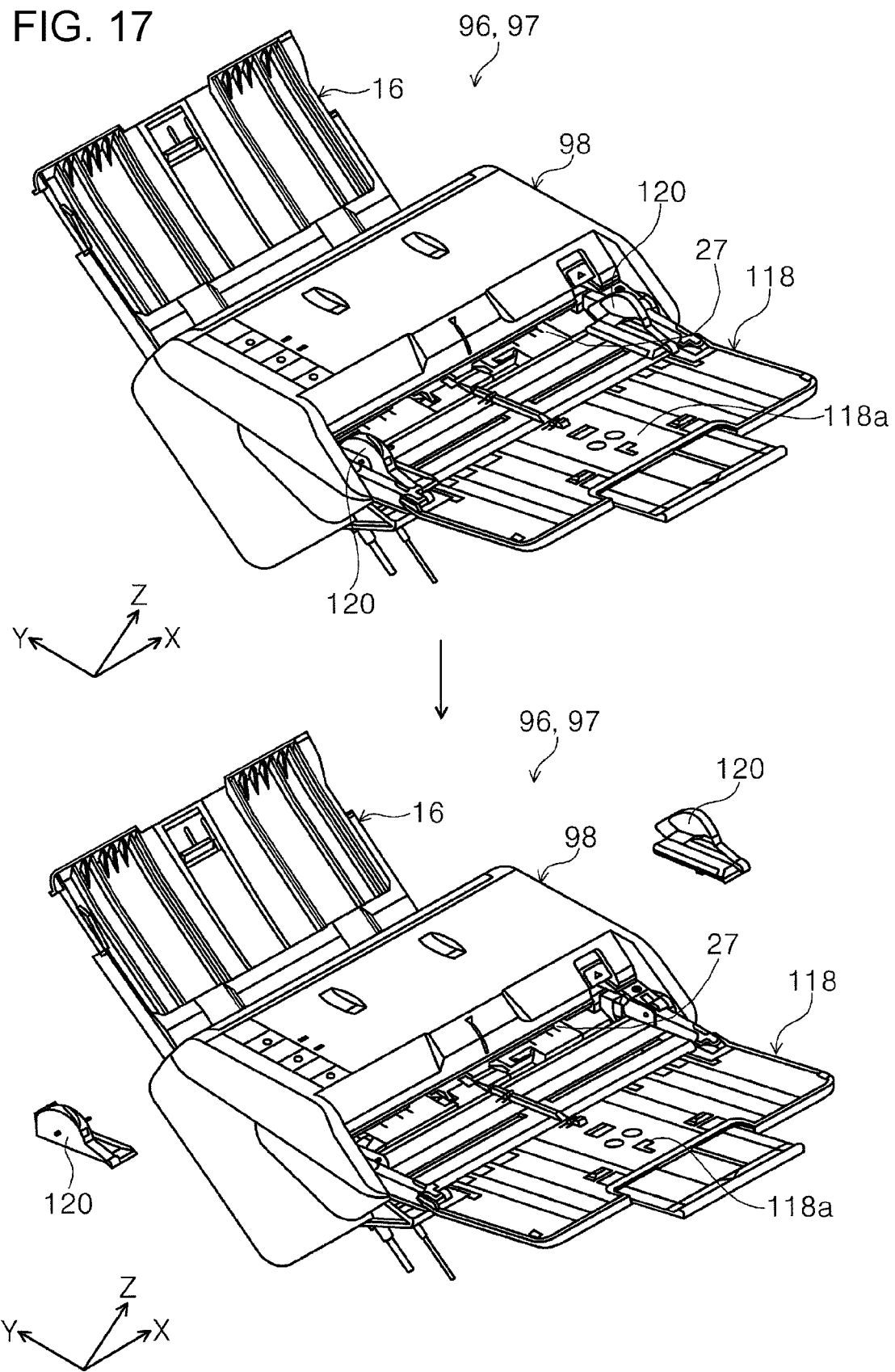
FIG. 17 provides perspective views showing a state in which a feed tray that allows edge guides to be attached to and detached from the feed tray is attached to the tray attachment portion of the scanner according to the sixth embodiment.
Figure 18:
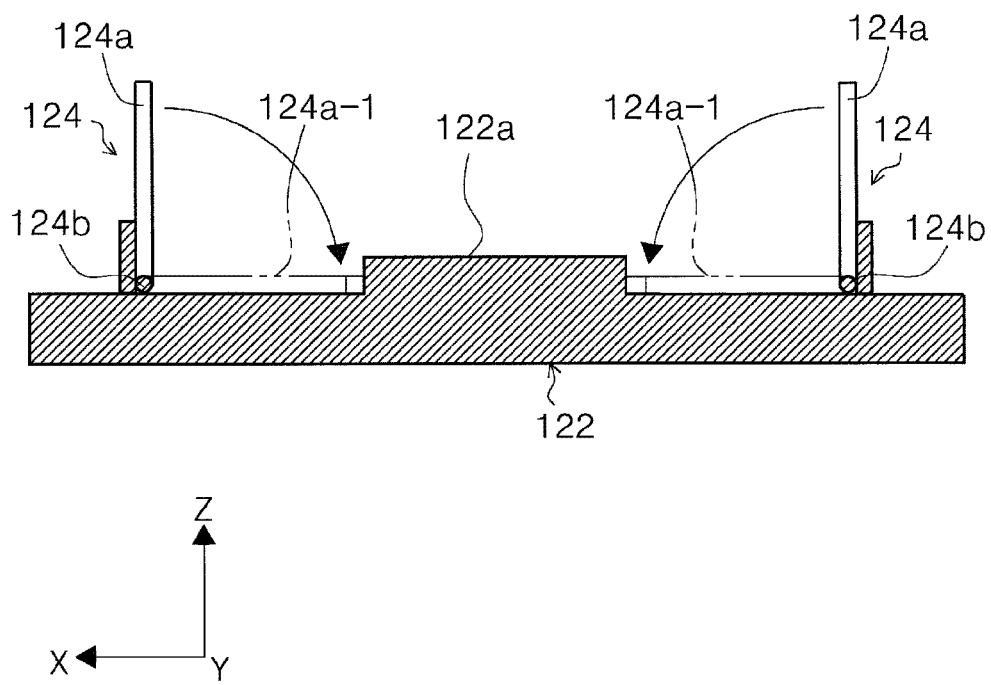
FIG. 18 is a cross-sectional view showing a feed tray having foldable edge guides.
Figure 19:
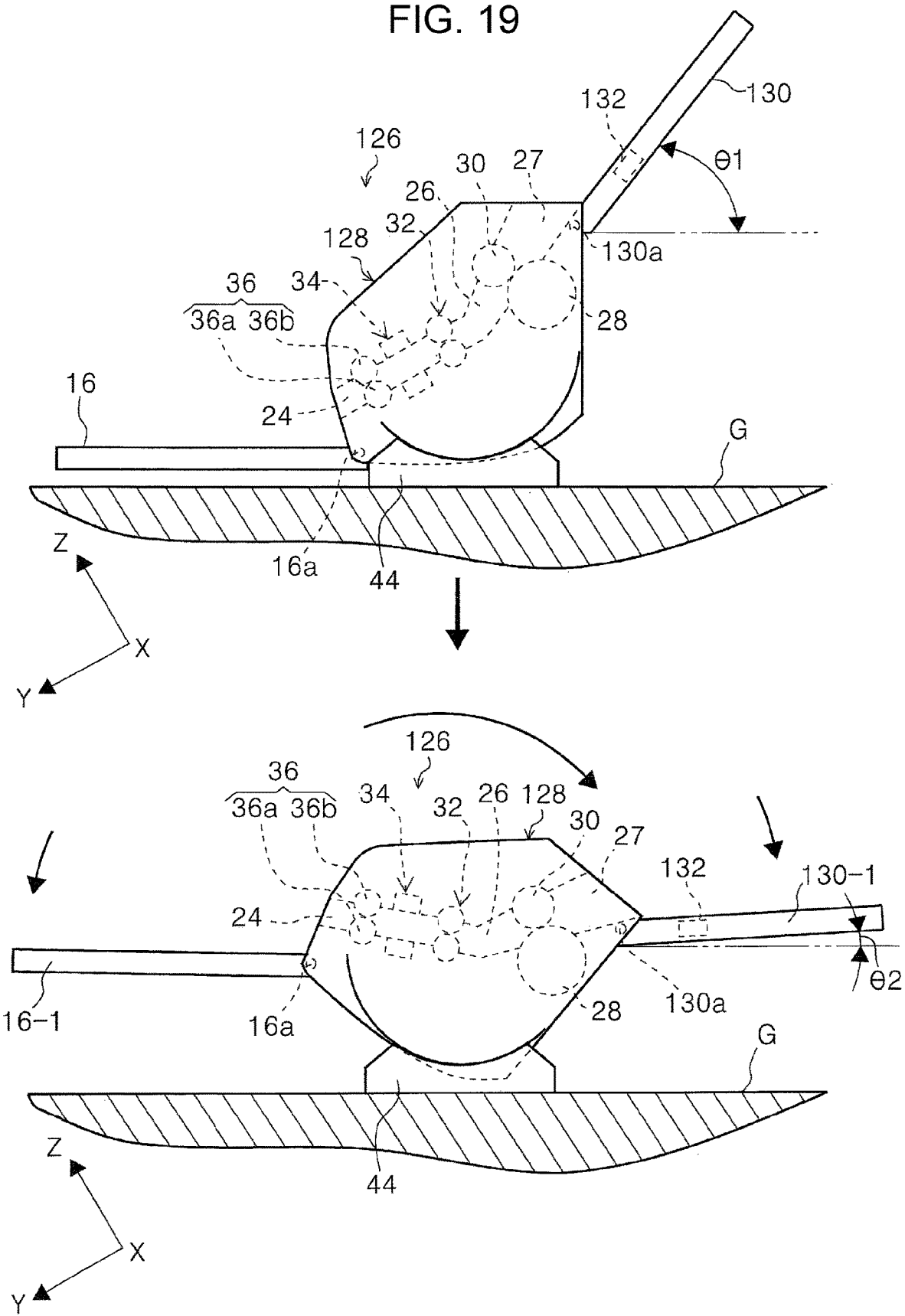
FIG. 19 provides schematic views showing switching from a first posture to a second posture of a scanner according to a seventh embodiment.

FIG. 17 provides perspective views showing a state in which a feed tray that allows edge guides to be attached to and detached from the feed tray is attached to the tray attachment portion of the scanner according to the sixth embodiment; FIG. 18 is a cross-sectional view showing a feed tray having foldable edge guides; FIG. 19 provides schematic views showing switching from a first posture to a second posture of a scanner according to a seventh embodiment; and FIG. 20 provides schematic views explaining a state in which the pressing force of a separation roller is adjusted in accordance with the posture of a feed tray in the scanner according to the seventh embodiment.

Figure 21:
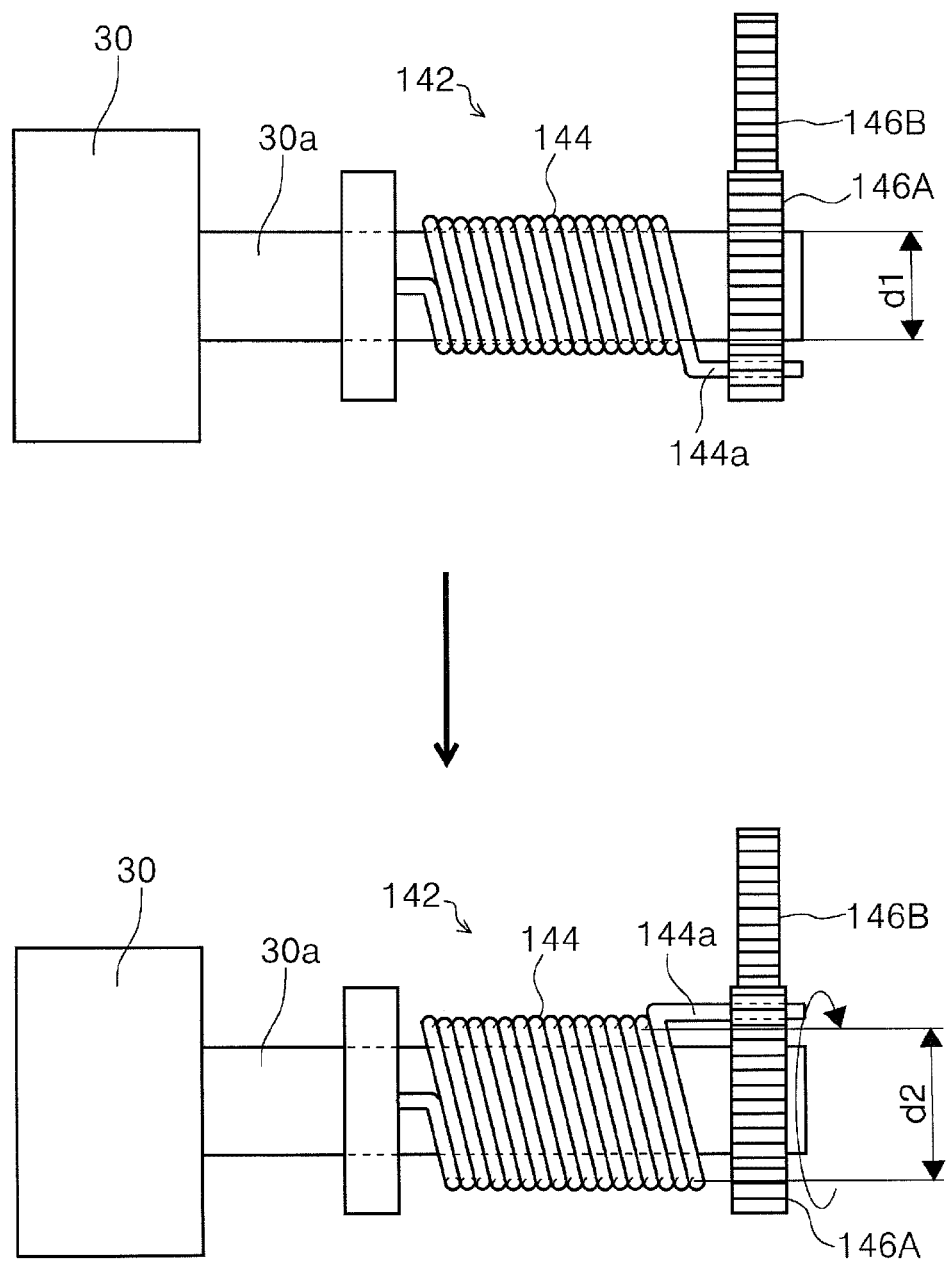
FIG. 21 provides schematic views explaining a state in which the separation load of the separation roller is adjusted in accordance with the posture of the feed tray in the scanner according to the seventh embodiment.
Figure 22:
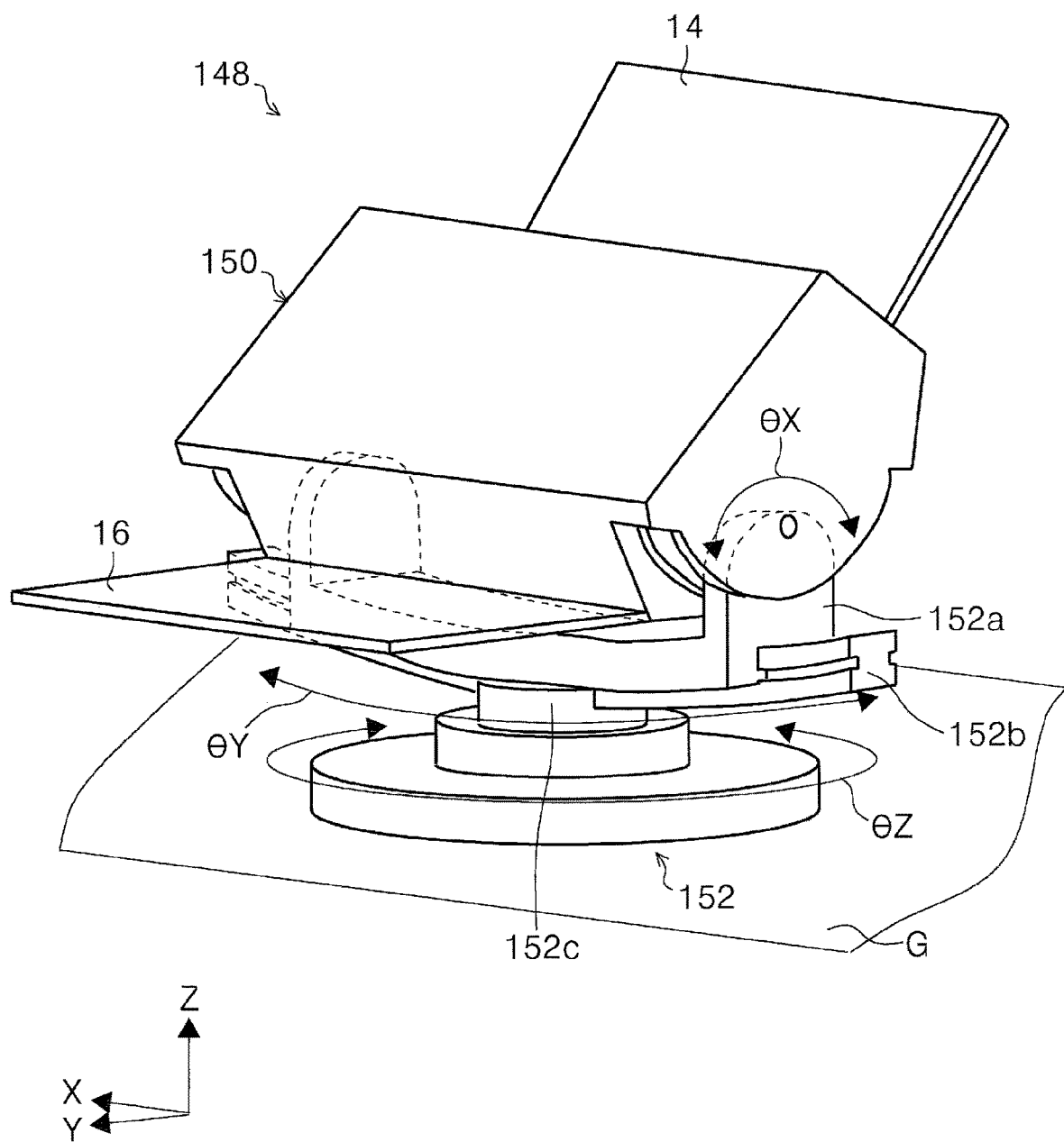
FIG. 22 is a perspective view of a scanner according to an eighth embodiment.
Figure 23:
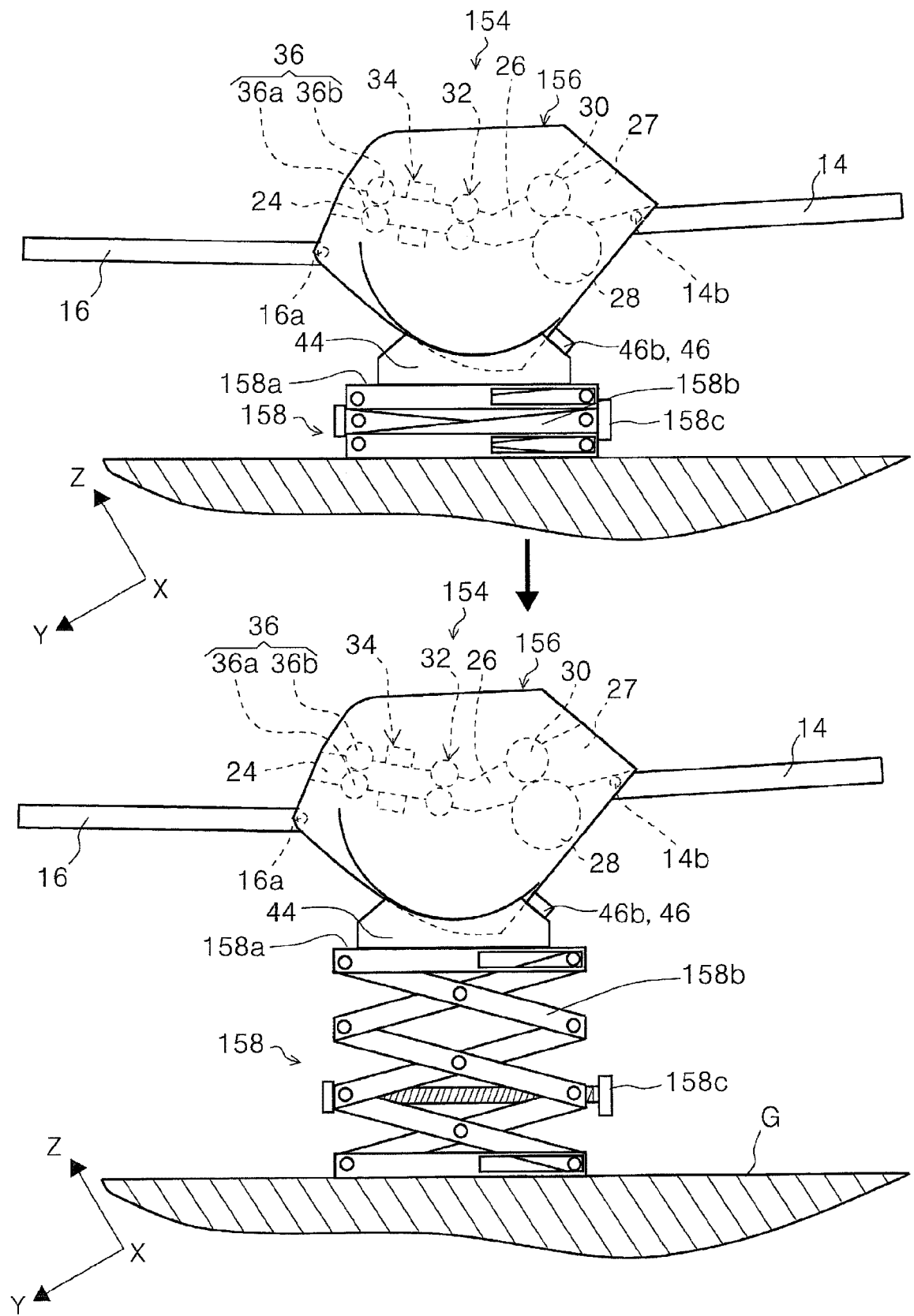
FIG. 23 provides side views of a scanner according to a ninth embodiment.
Figure 24:
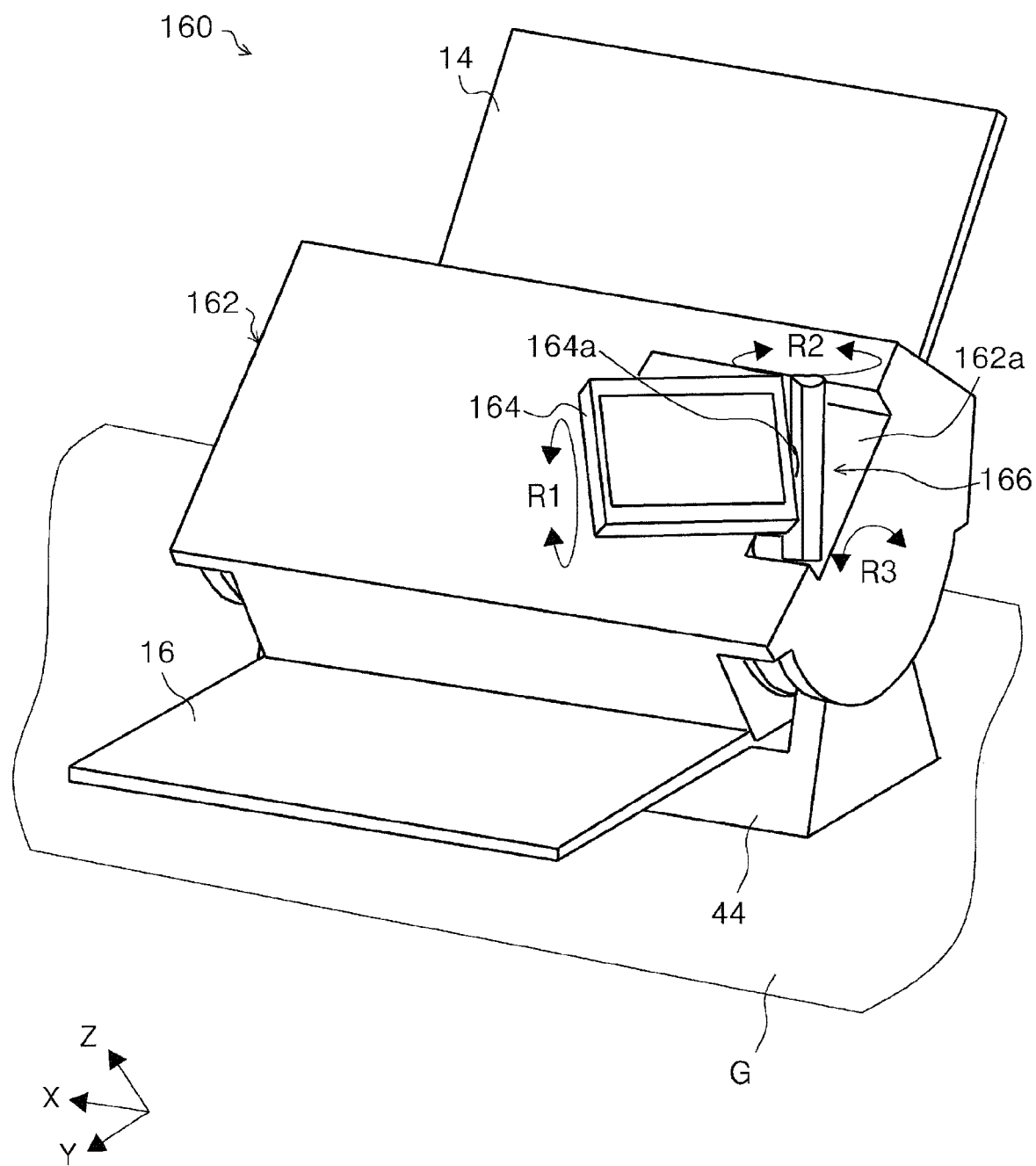
FIG. 24 is a perspective view of a first posture of a scanner according to a tenth embodiment.

FIG. 21 provides schematic views explaining a state in which the separation load of the separation roller is adjusted in accordance with the posture of the feed tray in the scanner according to the seventh embodiment; FIG. 22 is a perspective view of a scanner according to an eighth embodiment; FIG. 23 provides side views of a scanner according to a ninth embodiment; and FIG. 24 is a perspective view of a first posture of a scanner according to a tenth embodiment.

Figure 25:
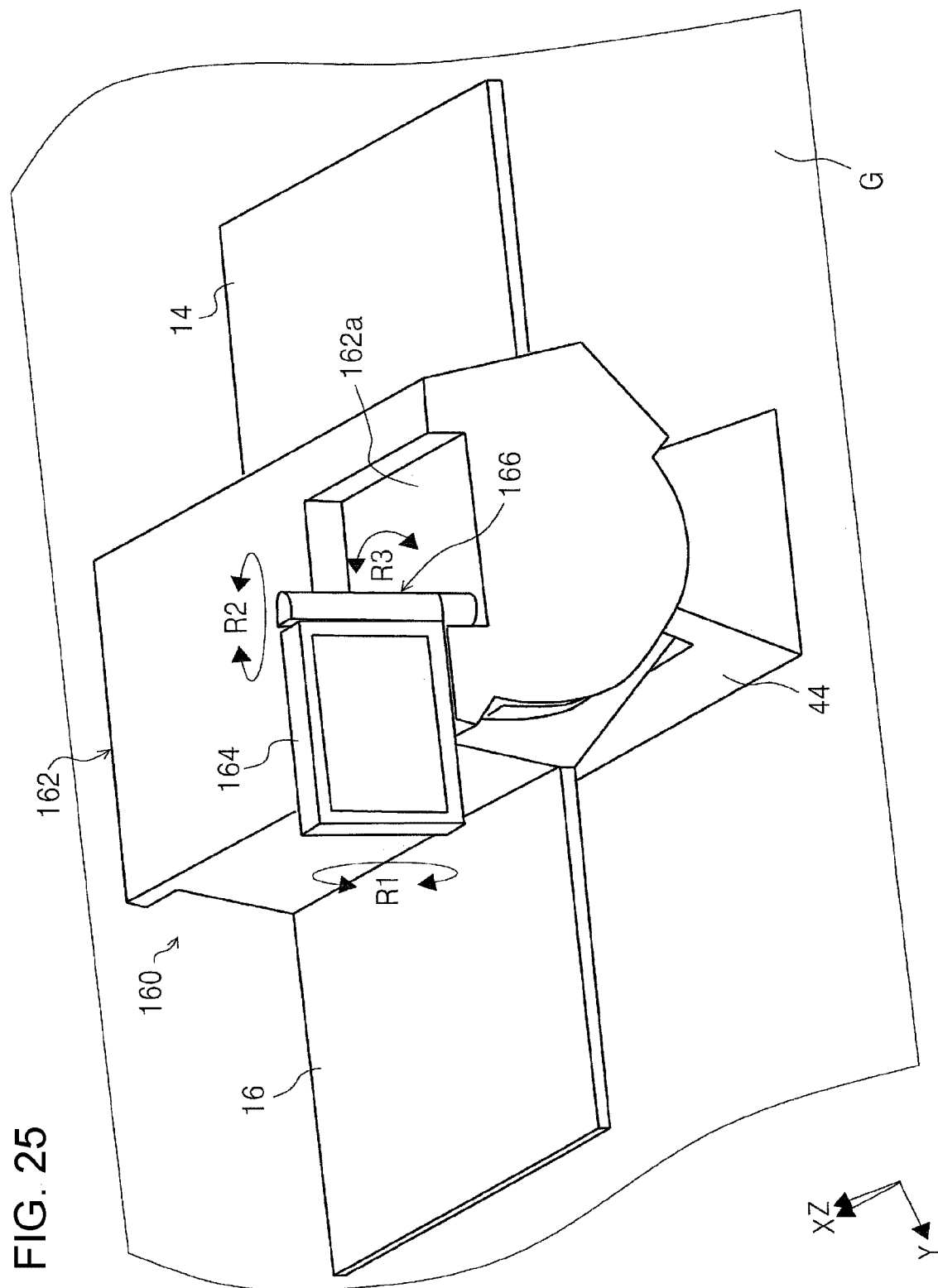
FIG. 25 is a perspective view of a second posture of the scanner according to the tenth embodiment.
Figure 26:
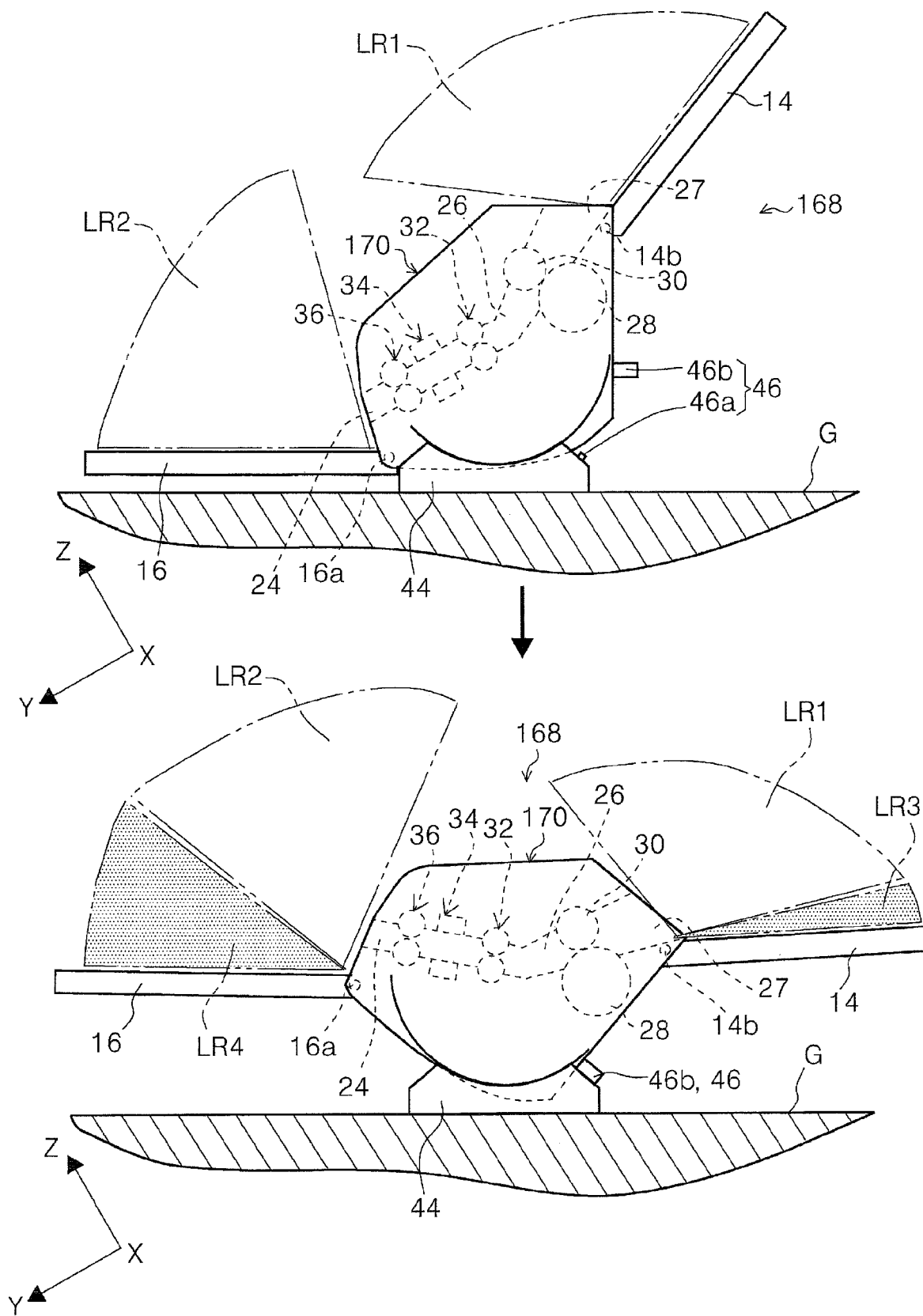
FIG. 26 provides schematic views explaining the entry range of light entering an apparatus body of a scanner according to an eleventh embodiment.
Figure 27:
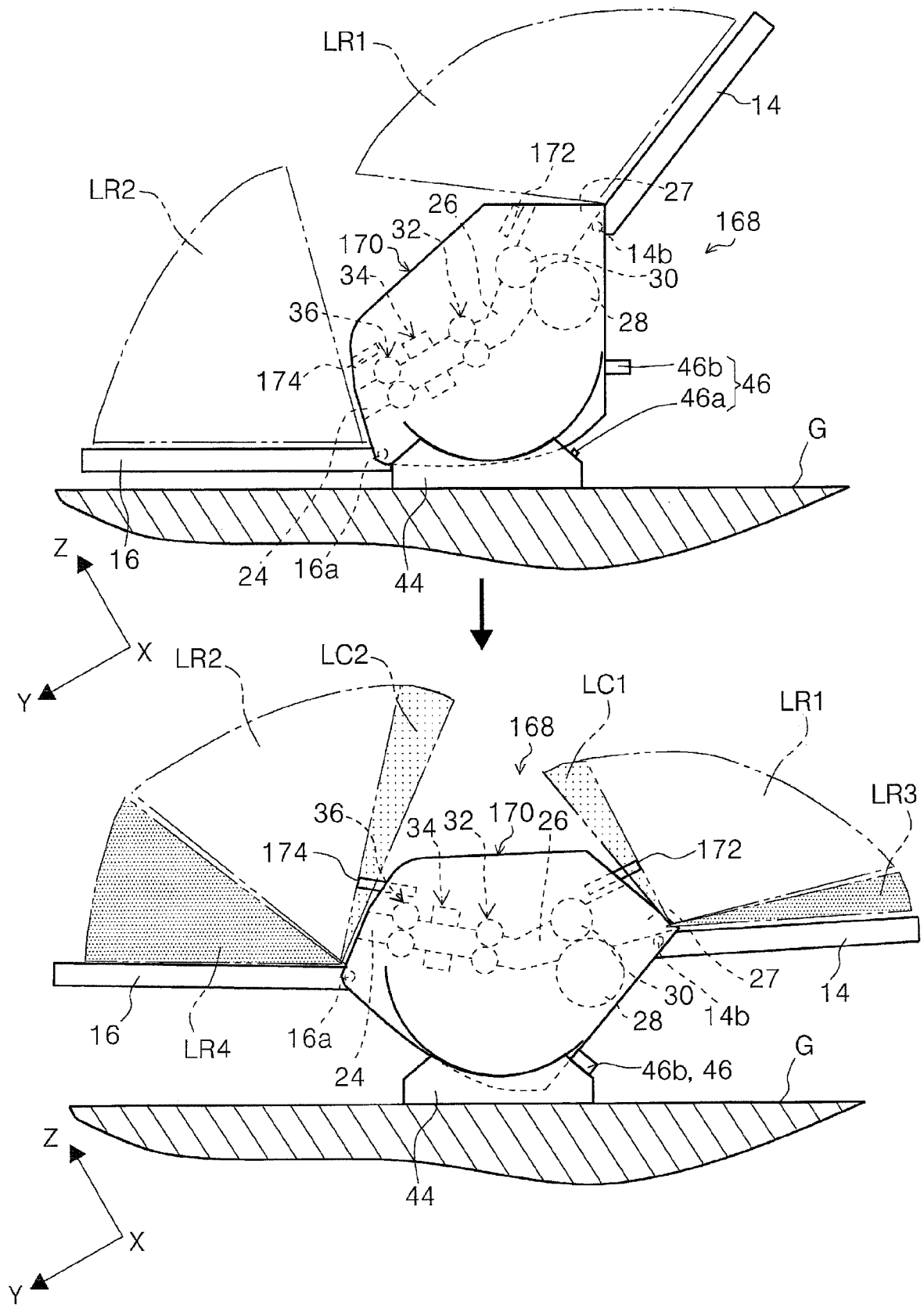
FIG. 27 provides schematic views explaining a limited state in which the entry range of light entering the apparatus body is limited by a first light-shielding member and a second light-shielding member in the scanner according to the eleventh embodiment.
Figure 28:
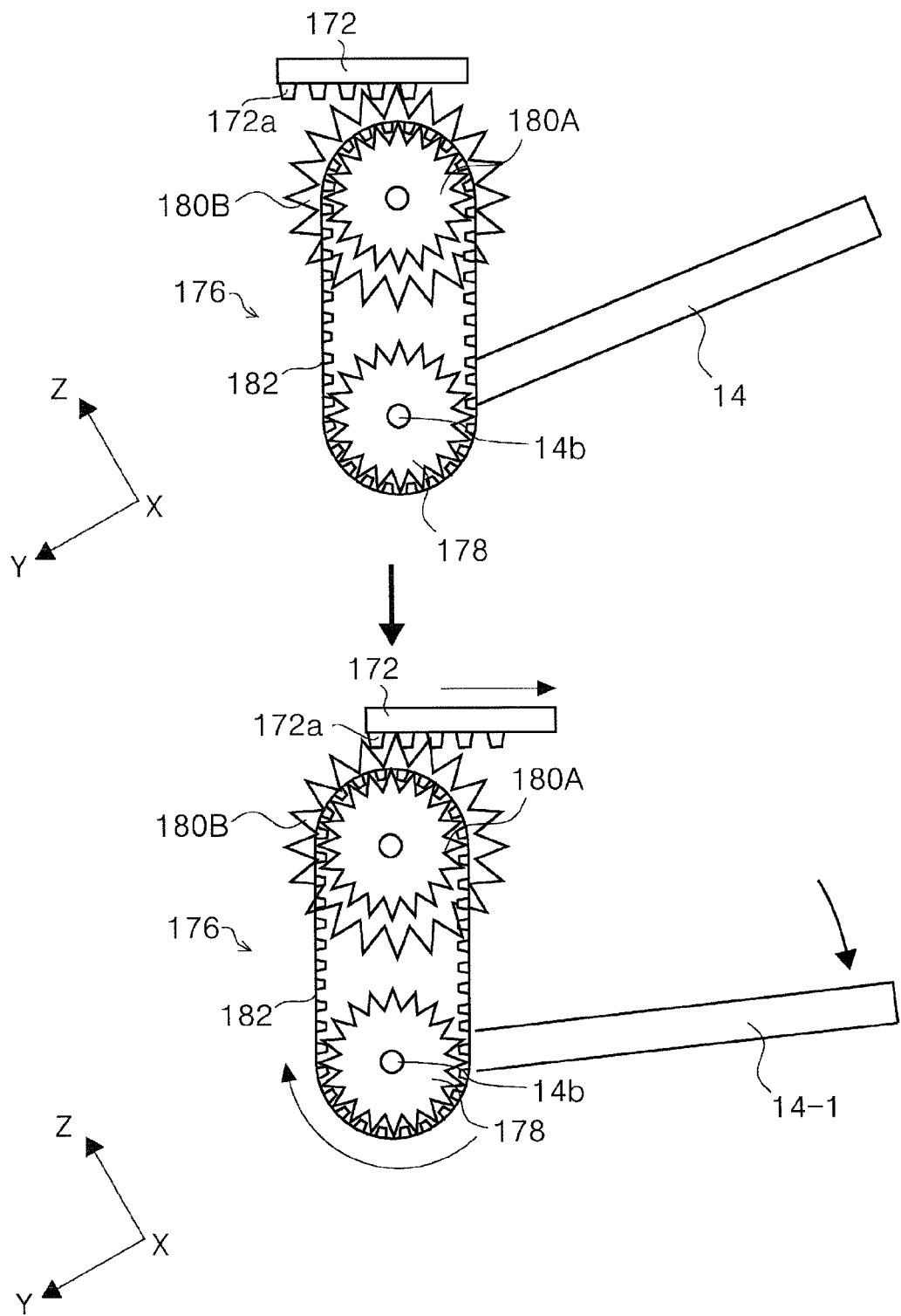
FIG. 28 provides schematic views of an association portion that associates the first light-shielding member with a feed tray in the scanner according to the eleventh embodiment.

FIG. 25 is a perspective view of a second posture of the scanner according to the tenth embodiment; FIG. 26 provides schematic views explaining the entry range of light entering an apparatus body of a scanner according to an eleventh embodiment; FIG. 27 provides schematic views explaining a limited state in which the entry range of light entering the apparatus body is limited by a first light-shielding member and a second light-shielding member in the scanner according to the eleventh embodiment; and FIG. 28 provides schematic views of an association portion that associates the first light-shielding member with a feed tray in the scanner according to the eleventh embodiment.

In the X-Y-Z coordinate system in each drawing, when a scanner 10 is in a first posture, the X-axis direction indicates an apparatus-width direction and a sheet-width direction, the Y-axis direction is a sheet-transport direction in an image reading apparatus, and the Z-axis direction is a direction orthogonal to the Y-axis direction and is a direction substantially orthogonal to a surface of a transported sheet. In each drawing, the +Y side is an apparatus-front-surface side, and the −Y side is an apparatus-rear-surface side. Further, the direction parallel to a surface on which the image reading apparatus is mounted is a horizontal direction. In this case, the parallel direction includes not only a direction strictly completely parallel to the mount surface, but also a direction with a tilt or the like caused by an assembly error or the like of the image reading apparatus.

Common Embodiment

Referring to FIGS. 1 and 2, the basic configuration of a scanner 10 is described as an image reading apparatus according to any one of first to eleventh embodiments described in this specification. The scanner 10 includes an apparatus body 12, a feed tray 14, and an output tray 16. The apparatus body 12 includes a lower unit 18 and an upper unit 20. In this embodiment, although not shown, the upper unit 20 is attached to the lower unit 18 so as to be rotatable relative to the lower unit 18 while an end portion on the +Y side serves as a rotation axis.

A user interface portion 22 is provided on the front surface side of the upper unit 20. Note that, in the tenth embodiment (described later), the user interface portion is a tilt panel. The user interface portion 22 is, for example, a touch panel, and serves as both a display portion and an operation portion. By operating the user interface portion 22, a medium reading operation or the like of the scanner 10 can be executed.

An output port 24 is provided below the user interface portion 22 on the front surface side of the scanner 10. The output tray 16 is provided below the output port 24. In this embodiment, the output tray 16 can be switched between a state housed in the lower unit 18 (FIGS. 1 and 2) and an expanded state pulled out to the front surface side from the lower unit 18 (for example, FIGS. 15 to 17).

Document Transport Path

Referring to FIG. 2, a medium feed path 26 in the scanner 10 is described. The thick solid line with reference sign P in FIG. 2 indicates a guide path for a medium that is transported along the medium feed path 26 in the scanner 10.

The feed tray 14 is provided at an end portion on the apparatus-rear-surface side of the lower unit 18. The feed tray 14 can support a medium (document) in a tilted posture. A plurality of media can be set on the feed tray 14. The feed tray 14 is provided with a pair of edge guides 14a (FIG. 1) that are displaceable in a direction toward each other or a direction away from each other. The edge guides 14a guide the side edges of a medium stacked on the feed tray 14. Moreover, the feed tray 14 is provided with a medium detector (not shown) that can detect setting of a medium P on the feed tray 14.

A feed port 27, a feed roller 28, a separation roller 30, a transport roller pair 32, an image reading section 34 serving as "a reader," and an output roller pair 36 are provided in the medium feed path 26 in the lower unit 18, from an upstream side (−Y side) to a downstream side (+Y side) in a medium feed direction. In this embodiment, the feed roller 28 is rotationally driven by, for example, a driving source (not shown) provided in the lower unit 18.

The separation roller 30 is provided at a position facing the feed roller 28. The separation roller 30 is provided in a state urged to the feed roller 28 by a pressing portion (not shown). The separation roller 30 separates a plurality of media when the media enter an area between the feed roller 28 and the separation roller 30 so as to send only the bottom medium to be fed to the downstream side in the feed direction. A medium supported by the feed tray 14 in a tilted posture is nipped by the feed roller 28 and the separation roller 30, and is transported to the transport roller pair 32 arranged on the downstream side in the feed direction. Then, the transport roller pair 32 sends the document fed from the feed roller 28 toward the image reading section 34.

The image reading section 34 includes a first reading unit 40A provided in the lower unit 18 to face a second surface of a medium that is transported along the medium feed path 26, and a second reading unit 40B provided in the upper unit 20 to face a first surface of the document that is transported along the medium feed path 26. In this embodiment, the first reading unit 40A and the second reading unit 40B are configured as a reading unit, and, for example, configured as a contact image sensor module (CISM).

When the document is sent by the transport roller pair 32 to the image reading section 34, an image on at least one of the first surface and the second surface of the medium P is read by the image reading section 34, then the medium P is nipped by the output roller pair 36 located downstream of the image reading section 34 in the transport direction, and the medium P is output from the output port 24. In this embodiment, the output roller pair 36 includes an output driving roller 36a that is rotationally driven by a driving source (not shown), and an output driven roller 36b that follows the rotation of the output driving roller 36a.

In FIG. 2, a controller 42 is provided in the apparatus body 12. In each embodiment, the controller 42 is configured as an electric circuit including a plurality of electronic components. The controller 42 according to this embodiment controls the transport and image reading operation for the medium P in the scanner 10. The controller 42 may control an operation required for executing the medium reading operation in the scanner 10, for example, in accordance with an instruction from the outside (personal computer (PC) or the like).

First Embodiment

A scanner 10 according to a first embodiment is described with reference to FIGS. 3 to 6. The scanner 10 includes an apparatus body 12 and a base portion 44. In this embodiment, the apparatus body 12 is attached to the base portion 44 so as to be rotatable relative to the base portion 44. In this embodiment, the base portion 44 is mounted on a mount surface G on which the scanner 10 is mounted. The thick line with reference sign P in the upper figure in FIG. 3 and the lower figure in FIG. 4 indicates a path for a medium P that is sent from a feed tray 14 to an output tray 16 along a medium feed path 26

In the upper figure in FIG. 3, the scanner 10 is in a first posture with respect to the mount surface G. In this embodiment, the first posture is set to a posture in which the feed tray 14 is at a first tilt angle θ1 (upper figure in FIG. 3) with respect to the mount surface G in the scanner 10. In each of the second to eleventh embodiments (described later), a first posture is set to a posture in which a feed tray is at a first tilt angle θ1 with respect to the mount surface G like the first embodiment.

In the upper figure in FIG. 3, when the apparatus body 12 of the scanner 10 is rotated to the −Y side relative to the base portion 44, the apparatus body 12 is brought into a second posture tilted toward the rear surface side as shown in the lower figure in FIG. 3. The second posture is set to a posture in which the tilt angle of the feed tray 14 with respect to the mount surface G is a second tilt angle θ2 (lower figure in FIG. 4) that is smaller than the first tilt angle θ1 in the first posture and that is close to the horizontal direction with respect to the mount surface G.

In this embodiment, the apparatus body 12 and the base portion 44 are provided with a body posture detector 46. In this embodiment, the body posture detector 46 includes a switch 46a and a pressing portion 46b. For example, the switch 46a is provided on the base portion 44, and the pressing portion 46b is provided on the rear surface side of the apparatus body 12. In this embodiment, for example, when the switch 46a is pressed by the pressing portion 46b, the controller 42 detects a detection signal. In this embodiment, the controller 42 determines that the apparatus body 12 is in the second posture when the controller 42 detects the detection signal from the body posture detector 46.

In the upper figure in FIG. 3, when the apparatus body 12 is in a first posture, the switch 46a and the pressing portion 46b of the body posture detector 46 are separated from each other. In this state, the controller 42 does not detect the detection signal from the body posture detector 46, and hence the controller 42 determines that the apparatus body 12 is in the first posture. In the lower figure in FIG. 3, when the apparatus body 12 is rotated from the first posture to a second posture, the pressing portion 46b of the body posture detector 46 presses the switch 46a. In this state, the controller 42 detects the detection signal from the body posture detector 46, and hence the controller 42 determines that the apparatus body 12 is in the second posture.

In this embodiment, the feed tray 14 is rotatable relative to the apparatus body 12. Specifically, the feed tray 14 has a rotating shaft 14b which is an example of "a feed-tray posture switching portion." The feed tray 14 can be switched between a first posture and a second posture while the rotating shaft 14b serves as the rotation axis. The rotating shaft 14b is provided at the feed tray 14 in this embodiment; however, the rotating shaft 14b may be provided at the apparatus body 12.

In this embodiment, the output tray 16 is rotatable relative to the apparatus body 12. Specifically, the output tray 16 has a rotating shaft 16a which is an example of "an output-tray posture switching portion." The output tray 16 can be switched between a first output posture in which the output tray 16 receives the medium output from the apparatus body 12 when the apparatus body 12 is in the first posture, and a second output posture in which the output tray 16 receives the medium output from the apparatus body 12 when the apparatus body 12 is in the second posture, while the rotating shaft 16a serves as a rotation axis. The rotating shaft 16a is provided at the output tray 16 in this embodiment; however, the rotating shaft 16a may be provided at the apparatus body 12.

In the upper figure in FIG. 4, in a state in which the apparatus body 12 is switched from the first posture to the second posture, the feed tray 14 keeps the first posture, and the output tray 16 also keeps the first output posture. As shown in the lower figure in FIG. 4, the feed tray 14 is rotated from the first posture to the second posture while the rotating shaft 14b serves as the rotation axis. Note that reference sign 14-1 in the lower figure in FIG. 4 indicates the feed tray 14 in the second posture. Similarly, the output tray 16 is rotated from the first output posture to the second output posture while the rotating shaft 16a serves as the rotation axis.

Thus, the scanner 10 is switched from a first posture (normal feed posture) in which a medium P is fed from an obliquely upper side on the rear surface side of the apparatus body 12 to the feed tray 14 and an image on the medium P is read, to a second posture (horizontal feed posture) in which a medium P is fed to the feed tray 14 in the horizontal direction with respect to the mount surface G or at an angle closer to the horizontal direction and an image on the medium P is read.

In the lower figure in FIG. 4, the feed tray 14 can be further rotated to the −Z side from the second posture and is brought into a state with reference sign 14-2. Note that a posture of the feed tray 14 with reference sign 14-2 is a third posture. When the feed tray 14 is in the third posture, the feed tray 14 is tilted so as to connect the apparatus body 12 and the mount surface G to each other.

When a long medium longer than the length in the feed direction of the feed tray 14 is fed, the long medium protruding from the feed tray 14 hangs from an end portion of the feed tray 14 on the upstream side in the feed direction toward the mount surface G. When the long medium is fed while hanging from the feed tray 14 toward the mount surface G in this way, the medium hanging toward the mount surface G is pressed to the edge of an end portion on the upstream side of the feed tray 14 due to the weight of the medium, and a frictional force occurs between the feed tray 14 and the medium hanging toward the mount surface G. Thus, the feed of the long medium is disturbed, and the medium may be damaged when rubbing with the edge of the end portion on the upstream side of the feed tray 14.

In this embodiment, the long medium longer than the feed tray 14 in the feed direction can be fed in the third posture (see reference sign 14-2). The third posture of the feed tray 14 is a posture more tilted toward the mount surface G than the second posture that is the horizontal posture with respect to the mount surface G (see reference sign 14-1). Consequently, the long medium is supported by the feed tray 14 from a position close to the mount surface G in a height direction, and is not pressed to the edge of the end portion on the upstream side of the feed tray 14. The frictional force between the feed tray 14 and the long medium can be decreased, and the medium is not damaged.

In this embodiment, by properly changing the posture of the feed tray 14 to one of the first, second, and third postures, the size of the medium to be fed into the apparatus body 12 in the feed direction can be properly changed. Consequently, the scanner 10 according to this embodiment can feed various kinds of media with different sizes in the feed direction from the feed tray 14, and read the media.

Output-Direction Switching Portion

Next, an output-direction switching portion 48 is described with reference to FIG. 5. For example, the output-direction switching portion 48 that switches the output direction of the medium P is provided in the apparatus body 12. The output-direction switching portion 48 includes gears 50A, 50B, and 50C, endless belts 52A and 52B, and a link member 54. In this embodiment, the gear 50A is provided coaxially with the rotating shaft 16a of the output tray 16, and rotates in the same direction as the direction of the rotating shaft 16a.

The gear 50B is spaced from the gear 50A. In this embodiment, the gear 50B is a compound gear. The endless belt 52A is wound around the gears 50A and 50B spaced from each other. The gear 50C is spaced from the gear 50B and supported by a rotating shaft 36c of the output driving roller 36a. The gear 50C rotates independently from the rotation of the output driving roller 36a and the rotating shaft 36c. The endless belt 52B is wound around the gears 50B and 50C spaced from each other. One end portion of the link member 54 is attached to the gear 50C. A rotating shaft 36d of the output driven roller 36b is attached to the other end portion of the link member 54.

In the upper and lower figures in FIG. 5, when the output tray 16 is rotated around the rotating shaft 16a as the rotation axis, the gear 50A rotates in the same direction as the direction of the rotating shaft 16a. The rotation of the gear 50A is transmitted to the gear 50B via the endless belt 52A, and the gear 50B also rotates in the same direction as the direction of the gear 50A. Further, when the gear 50B rotates, the rotation of the gear 50B is transmitted to the gear 50C via the endless belt 52B, and the gear 50C also rotates.

When the gear 50C rotates, the link member 54 rotates in the same direction as the direction of the gear 50C. Thus, the output driven roller 36b rotates relative to the output driving roller 36a so that the rotating shaft 36d of the output driven roller 36b is displaced around the rotating shaft 36c of the output driving roller 36a.

In the upper figure in FIG. 5, the output tray 16 is in the first output posture. In this state, a tangential line S1 at a nip point N1 between the output driving roller 36a and the output driven roller 36b extends in the Y-axis direction. For example, the medium P output by the output roller pair 36 advances to the +Y side along the tangential line S1, and is stacked on the output tray 16 in the first output posture. The two-dot chain line with reference sign P1 indicates an output path for a medium when the output tray 16 is in the first output posture.

In the lower figure in FIG. 5, when the output tray 16 is rotated to the −Z side to switch the posture from the first output posture to the second output posture, the nip point N1 between the output driving roller 36a and the output driven roller 36b moves counterclockwise around the rotating shaft 36c of the output driving roller 36a. Consequently, the nip point between the output driving roller 36a and the output driven roller 36b moves to a position of N2. Thus, a tangential line S2 passing through the nip point N2 is tilted to the −Z side relative to the tangential line S1. Consequently, the medium P output by the output roller pair 36 advances to the +Y side along the tangential line S2, and is stacked on the output tray 16 in the second output posture. The two-dot chain line with reference sign P2 indicates an output path for a medium when the output tray 16 is in the second output posture.

Thus, as shown in the upper and lower figures in FIG. 5, when the position of the output driven roller 36b with respect to the output driving roller 36a is changed by the output-direction switching portion 48 around the rotating shaft 36c, the output direction of the medium P can be switched.

Separation-Roller Displacing Portion

A separation-roller displacing portion 56 is described with reference to FIG. 6. The separation-roller displacing portion 56 includes gears 58A and 58B, an endless belt 60, and a link member 62. In this embodiment, the gear 58A is provided coaxially with the rotating shaft 14b of the feed tray 14, and when the rotating shaft 14b rotates, the gear 58A rotates together in the same direction as the direction of the rotating shaft 14b.

The gear 58B is spaced from the gear 58A. The endless belt 60 is wound around the gears 58A and 58B spaced from each other. The gear 58B is supported by a rotating shaft 28a of the feed roller 28. The gear 58B rotates independently from the rotation of the feed roller 28 and the rotating shaft 28a. One end portion of the link member 62 is attached to the gear 58B. A rotating shaft 30a of the separation roller 30 is attached to the other end portion of the link member 62.

In the upper and lower figures in FIG. 6, when the feed tray 14 is rotated around the rotating shaft 14b as the rotation axis, the gear 58A rotates in the same direction as the direction of the rotating shaft 14b. The rotation of the gear 58A is transmitted to the gear 58B via the endless belt 60, and the gear 58B also rotates in the same direction as the direction of the gear 58A.

When the gear 58B rotates, the link member 62 rotates in the same direction as the direction of the gear 58B. Thus, the separation roller 30 rotates relative to the feed roller 28 so that the rotating shaft 30a of the separation roller 30 is displaced around the rotating shaft 28a of the feed roller 28.

In this embodiment, when the feed tray 14 is in the first posture (upper figure in FIG. 6), a tangential line S3 passing through a nip point N3 between the feed roller 28 and the separation roller 30 is set to be along with the feed direction of the feed tray 14 in the first posture.

In this case, when the feed tray 14 is switched from the first posture (upper figure in FIG. 6) to the second posture (lower figure in FIG. 6), the separation-roller displacing portion 56 displaces the nip point between the feed roller 28 and the separation roller 30 clockwise around the rotating shaft 28a, and moves the nip point from the position of the nip point N3 to the position of a nip point N4. Even in this state, as shown in the lower figure in FIG. 6, a tangential line S4 passing through the nip point N4 is set to be along with the feed direction of the feed tray 14 in the second posture (state with reference sign 14-1).

Thus, as shown in the upper and lower figures in FIG. 6, when the position of the separation roller 30 with respect to the feed roller 28 is changed by the separation-roller displacing portion 56 around the rotating shaft 28a, the feed direction of the medium P can be switched.

Feed Mode

Referring to FIGS. 3 and 4 again, a feed mode of the scanner 10 is described. In this embodiment, the controller 42 determines switching between the first posture (normal feed posture) and the second posture (horizontal feed posture) of the apparatus body 12 in accordance with detection information from the body posture detector 46. The controller 42 selects a first feed mode when the apparatus body 12 is in the first posture, and selects a second feed mode when the apparatus body 12 is in the second posture.

In this embodiment, in a state in which a medium P is set on the feed tray 14 (the feed tray 14 is in the first posture) of the apparatus body 12 in the first posture (normal feed posture), when a user performs a reading execution operation for the medium P by using the user interface portion 22 or an external input portion, the controller 42 selects the first feed mode as a mode for feeding the medium set on the feed tray 14 and performing the image reading operation on the medium.

In contrast, when the controller 42 detects setting of a medium P on the feed tray 14 (the feed tray 14 is in the second posture) of the apparatus body 12 in the second posture (horizontal feed posture) by using a medium detector (not shown), the controller 42 selects the second feed mode as a mode for feeding the medium set on the feed tray 14 and performing the image reading operation on the medium without waiting for the reading execution operation by the user.

In this embodiment, the controller 42 is set to switch the feed mode from the first feed mode to the second feed mode when the apparatus body 12 is switched from the first posture to the second posture, and is set to switch the feed mode from the second feed mode to the first feed mode when the apparatus body 12 is switched from the second posture to the first posture. Thus, since the controller 42 automatically switches the feed mode when the user switches the posture of the scanner 10, the user does not have to manually switch the feed mode, and convenience of the scanner 10 can be increased.

Further, the medium feed operation when the apparatus body 12 and the feed tray 14 are in the second posture and when the output tray 16 is in the second output posture is described with reference to FIG. 7. In FIG. 7, a large bundle of media Pb is placed on the back surface side of the apparatus body 12 in the second posture. The user sets the large bundle of media Pb on the feed tray 14 one by one from the top while checking the content of each document. In this embodiment, the apparatus body 12 and the feed tray 14 are in the second posture, that is, are horizontal with respect to the mount surface G or are tilted at angles close to the horizontal direction. Hence, the user can set a medium on the feed tray 14 by laterally sliding the medium from the bundle of media Pb or by holding the medium and moving the medium in the horizontal direction. Consequently, a motion path U of a hand of the user can be decreased in length, and workability can be increased. The broken line with reference sign P in FIG. 7 indicates a medium feed path from the feed tray 14 to the output tray 16 in the second posture (horizontal feed posture).

Although not shown in each embodiment of the third and later embodiments, the above-described output-direction switching portion 48 and separation-roller displacing portion 56 are provided in the scanner according to each embodiment.

Summarizing the above description, the scanner 10 includes the apparatus body 12 having the image reading section 34 that reads a medium P; the output tray 16 that is provided at the apparatus body 12 and that receives the medium P which is output thereon; the output roller pair 36 that outputs the medium P to the output tray 16; the rotating shaft 16a that switches, independently from switching of the posture of the apparatus body 12 with respect to the mount surface G on which the apparatus body 12 is mounted, the posture of the output tray 16 with respect to the apparatus body 12; and the output-direction switching portion 48 that switches the output direction of the medium P by the output roller pair 36. With this configuration, the needs of the user of taking out a medium from the output tray 16 can be more flexibly satisfied. Also, even when the posture of the output tray 16 with respect to the apparatus body 12 is changed, stacking efficiency for media on the output tray 16 can be properly maintained.

The output roller pair 36 includes the output driving roller 36a that is rotationally driven, and the output driven roller 36b that nips the medium P between the output driven roller 36b and the output driving roller 36a and that follows the rotation of the output driving roller 36a. The output-direction switching portion 48 switches the output direction of the medium P by displacing the center of the rotating shaft 36d of the output driven roller 36b around the center of the rotating shaft 36c of the output driving roller 36a. With this configuration, the output-direction switching portion 48 can reliably switch the output direction of the medium P.

The rotating shaft 14b switches the posture of the feed tray 14 in association with the switching of the posture of the apparatus body 12. With this configuration, since the rotating shaft 14b switches the posture of the feed tray 14 in association with the switching of the posture of the apparatus body 12, the user does not have to manually switch the posture of the feed tray 14, and the scanner 10 with high usability can be provided.

The scanner 10 includes the feed roller 28 that sends the medium from the feed tray 14; the separation roller 30 that separates the medium by nipping the medium P between the separation roller 30 and the feed roller 28; and the separation-roller displacing portion 56 that displaces the center of the rotating shaft 30a of the separation roller 30 around the center of the rotating shaft 28a of the feed roller 28. With this configuration, even when the posture of the feed tray 14 is changed with respect to the mount surface G, separation efficiency for media by the separation roller 30 can be properly maintained.

The scanner 10 includes the apparatus body 12 having the image reading section 34 that reads a medium P; the feed tray 14 that is provided at the apparatus body 12 and that supports the medium P which is set thereon; and the controller 42 that controls feed of the medium P from the feed tray 14. The controller 42 switches the feed mode when the medium P is fed from the feed tray 14 in accordance with the switching of the posture of the apparatus body 12 with respect to the mount surface G on which the apparatus body 12 is mounted. With this configuration, the user does not have to perform an operation for switching the feed mode in accordance with the posture of the apparatus body 12, and the scanner 10 with high usability can be provided.

The apparatus body 12 can be switched between the first posture in which the feed tray 14 is at the first tilt angle θ1, and the second posture in which the feed tray 14 is at the second tilt angle θ2 that is closer to the horizontal direction than the first tilt angle θ1 or the feed tray 14 is horizontal. The feed mode includes the first feed mode that starts feed of the medium P based on the reading execution operation by the user, and the second feed mode that starts feed of the medium P when setting of the medium P on the feed tray 14 is detected. The controller 42 selects the second feed mode at least when the apparatus body 12 is in the second posture.

With this configuration, the controller 42 selects the second feed mode, that is, the feed mode that starts feed of the medium P if the controller 42 detects setting of the medium on the feed tray 14 at least when the apparatus body 12 is in the second posture. Thus, when the user performs the work of setting the medium P on the feed tray 14, the user does not have to perform the reading execution operation such as pressing a reading execution button every time when the user sets the medium P, thereby increasing usability.

The controller 42 switches the feed mode from the second feed mode to the first feed mode when the apparatus body 12 is switched from the second posture to the first posture. With this configuration, the controller 42 does not have to switch the feed mode when the first feed mode is used in the first posture, thereby increasing usability.

The scanner 10 includes the body posture detector 46 that detects the posture of the apparatus body 12 with respect to the mount surface G. The controller 42 switches the feed mode based on the detection information from the body posture detector 46. With this configuration, the feed mode can be reliably switched to one suitable for the posture of the apparatus body 12.

Modifications of First Embodiment (1) In this embodiment, the body posture detector 46 detects that the apparatus body 12 is in the second posture if the switch 46a is pressed. However, instead of this configuration, the body posture detector 46 may detect that the apparatus body 12 is in the first posture if the switch 46a and the pressing portion 46b are separated from each other.

(2) In this embodiment, the body posture detector 46 is the switch 46a that is switched between ON and OFF with the switching of the posture of the apparatus body 12. However, instead of this configuration, for example, the body posture detector 46 may be a detector, such as an acceleration sensor, a tilt sensor, or a gyro sensor that can detect the switching of the posture of the apparatus body 12.

(3) In this embodiment, when a long medium is fed, it is desirable to feed the long medium by switching the feed tray 14 to the third posture. Since the long medium has a larger weight than that of a medium of a normal size (for example, A4 size or the like), the load of the feed roller 28 that lifts up the long medium from the mount surface G and feeds the long medium increases. In this case, a plurality of rollers that are rotationally driven in association with the rotation of the feed roller 28 may be arranged on the medium support surface of the feed tray 14. Accordingly, when the long medium is fed, by rotationally driving the rollers and assisting feed of the long medium, the load of the feed roller 28 can be decreased, and the long medium can be smoothly fed.

Second Embodiment

The above-described output-direction switching portion 48 included in the scanner 10 may be replaced with an output-direction switching portion 64 according to a second embodiment which is described below. The configuration of the output-direction switching portion 64 according to the second embodiment is described below with reference to FIG. 8. The same reference sign is applied to a configuration similar to that in the first embodiment.

The output-direction switching portion 64 includes, for example, a cam member 66 and a link member 68. In this embodiment, the cam member 66 is attached to the rotating shaft 16a of the output tray 16. The link member 68 is provided with an engagement portion 68a. The engagement portion 68a has a guide surface 68b on the side facing the output roller pair 36. The guide surface 68b is tilted to the −Z side. In this embodiment, the link member 68 is arranged on the +Y side of the output roller pair 36 in the medium feed direction. A lower end portion 68c of the link member 68 is engaged with the cam member 66. In this embodiment, when the cam member 66 rotates, the link member 68 vertically moves in the Z-axis direction.

In the upper figure in FIG. 8, the output tray 16 is in the first output posture. In this state, the engagement portion 68a of the link member 68 that is engaged with the cam member 66 is located on the +Z side with respect to a tangential line S5 passing through a nip point N5 between the output driving roller 36a and the output driven roller 36b. That is, the engagement portion 68a of the link member 68 does not cross an output path P3 for the medium to be output by the output roller pair 36.

In contrast, in the lower figure in FIG. 8, when the output tray 16 is rotated from the first output posture to the second output posture in a direction with an arrow (counterclockwise in the lower figure in FIG. 8), the cam member 66 is rotated with the rotation of the output tray 16 (rotating shaft 16a). Consequently, the link member 68 engaged with the cam member 66 is displaced toward the −Z side.

Thus, the engagement portion 68a intersects with the tangential line S5 passing through the nip point N5 between the output driving roller 36a and the output driven roller 36b, and is displaced to the −Z side up to the position at which the engagement portion 68a crosses the tangential line S5. Consequently, the leading end of the medium P output by the output roller pair 36 contacts the guide surface 68b of the engagement portion 68a of the link member 68, and is guided to the −Z side by the guide surface 68b. Thus, the advance direction of the medium P is changed to the −Z side, and is directed to the output tray 16 that is in the second output posture. The two-dot chain line with reference sign P4 indicates an output path for the medium P the direction of which is changed by the guide surface 68b.

The output-direction switching portion 64 is provided downstream of the output roller pair 36, and switches the output direction of the medium P by coming into contact with the medium P and changing the advance direction of the medium P. With this configuration, the output-direction switching portion 64 can switch the output direction of the medium with a simple configuration.

Third Embodiment

The above-described base portion 44 included in the scanner 10 according to the first embodiment may be replaced with a first leg portion 74 and a second leg portion 76 according to a third embodiment which is described below. The configuration of a scanner 70 according to the third embodiment is described below with reference to FIGS. 9 and 10. The same reference sign is applied to a configuration similar to that in the first embodiment.

In this embodiment, the scanner 70 includes the first leg portion 74 and the second leg portion 76. The first leg portion 74 is provided at a bottom portion of an apparatus body 72 in a first posture (normal feed posture). The first leg portion 74 is rotatable relative to the apparatus body 72 around a rotating shaft 74a serving as a rotation axis. The first leg portion 74 can be switched between a state housed in the bottom portion of the apparatus body 72 (upper figure in FIG. 9), and a state pulled out from the apparatus body 72 (lower figure in FIG. 9).

The second leg portion 76 is provided at an end portion on the rear surface side of the apparatus body 72 in the first posture (normal feed posture). The second leg portion 76 is rotatable relative to the apparatus body 72 around a rotating shaft 76a serving as a rotation axis. The second leg portion 76 can be switched between a state housed in an end portion on the rear surface side of the apparatus body 72 (upper figure in FIG. 9) and a state pulled out from the apparatus body 72 (lower figure in FIG. 9).

In the lower figure in FIG. 9, the posture of the scanner 70 is switched from the first posture to the second posture by lifting the apparatus body 72 from the mount surface G, pulling out the first leg portion 74 and the second leg portion 76 from the apparatus body 72, and then mounting the apparatus body 72 on the mount surface G. In the lower figure in FIG. 9, the two-dot chain line portion with reference sign 16 indicates the first output posture of the output tray 16, and the solid line portion with reference sign 16-1 indicates the second output posture of the output tray 16, the two-dot chain line portion with reference sign 14 indicates the first posture of the feed tray 14, and the solid line portion with reference sign 14-1 indicates the second posture of the feed tray 14. Further, in the lower figure in FIG. 9, the solid line with reference sign P6 indicates a medium feed path when the scanner 70 is in the second posture (horizontal feed posture).

An output-tray posture switching portion 78 and a feed-tray posture switching portion 80 according to this embodiment are described with reference to FIG. 10. The output-tray posture switching portion 78 includes a gear train 82 including a plurality of gears, and adjacent gears of the plurality of gears in the gear train 82 are meshed with each other. In the gear train 82, a gear 82A is provided coaxially with the rotating shaft 74a of the first leg portion 74, and rotates together with the rotating shaft 74a. In contrast, in the gear train 82, a gear 82B is provided coaxially with the rotating shaft 16a of the output tray 16, and rotates together with the rotating shaft 16a.

In the upper figure in FIG. 10, when the first leg portion 74 is housed in the bottom portion of the apparatus body 72, the output tray 16 is in the first output posture. In the lower figure in FIG. 10, when the first leg portion 74 is pulled out from the apparatus body 72, the rotating shaft 74a and the gear 82A rotate in the same direction. The rotation of the gear 82A is transmitted to the gear 82B via the plurality of gears of the gear train 82. Hence, the gear 82B and the rotating shaft 16a are also rotated. Consequently, the output tray 16 is rotated from the first output posture to the second output posture. Thus, the output-tray posture switching portion 78 can associate the rotation operation of the first leg portion 74 with the rotation operation of the output tray 16.

The feed-tray posture switching portion 80 includes a gear train 84 including a plurality of gears, and adjacent gears of the plurality of gears in the gear train 84 are meshed with each other. In the gear train 84, a gear 84A is provided coaxially with the rotating shaft 76a of the second leg portion 76, and rotates together with the rotating shaft 76a. In contrast, in the gear train 84, a gear 84B is provided coaxially with the rotating shaft 14b of the feed tray 14, and rotates together with the rotating shaft 14b.

In the upper figure in FIG. 10, when the second leg portion 76 is housed in the end portion on the rear surface side of the apparatus body 72, the feed tray 14 is in the first posture. In the lower figure in FIG. 10, when the second leg portion 76 is pulled out from the apparatus body 72, the rotating shaft 76a and the gear 84A rotate in the same direction. The rotation of the gear 84A is transmitted to the gear 84B via the plurality of gears of the gear train 84. Hence, the gear 84B and the rotating shaft 14b are also rotated. Consequently, the feed tray 14 is rotated from the first posture to the second posture. Thus, the feed-tray posture switching portion 80 can associate the rotation operation of the second leg portion 76 with the rotation operation of the feed tray 14.

Therefore, in this embodiment, when the first leg portion 74 and the second leg portion 76 are rotated to switch the apparatus body 72 from the first posture to the second posture, or from the second posture to the first posture, the feed tray 14 and the output tray 16 are also switched to the postures suitable for the posture of the apparatus body 72 in association with the rotation operations of the first leg portion 74 and the second leg portion 76. Consequently, the user does not have to perform the posture switching operations of the feed tray 14 and the output tray 16 in addition to the posture switching operation of the apparatus body 72, thereby increasing workability.

Although not shown in FIGS. 9 and 10, the above-described output-direction switching portion 48 and separation-roller displacing portion 56, described in the first embodiment, are also provided in the scanner 70 according to the third embodiment. When the first leg portion 74 and the second leg portion 76 are rotated, the output-direction switching portion 48 and the separation-roller displacing portion 56 are operated in association with the switching of the postures of the feed tray 14 and the output tray 16.

The output-tray posture switching portion 78 switches the posture of the output tray 16 and the output-direction switching portion 48 switches the output direction of the medium in association with the switching of the posture of the apparatus body 72. With this configuration, the user does not have to manually switch the posture of the output tray 16 and does not have to manually switch the output direction of the medium P, and the scanner 70 with high usability can be provided.

The feed-tray posture switching portion 80 switches the posture of the feed tray 14 and the separation-roller displacing portion 56 displaces the separation roller 30 in association with the switching of the posture of the apparatus body 72. With this configuration, the user does not have to manually switch the posture of the feed tray 14 and does not have to manually displace the separation roller 30, and the scanner 70 with high usability can be provided.

Modification of Third Embodiment

In this embodiment, the gear train 82 performs the power transmission from the first leg portion 74 to the output tray 16. However, instead of this configuration, another power transmission portion, such as an endless belt or a chain, may perform the power transmission. Similarly, instead of the gear train 84, another power transmission portion may perform the power transmission from the second leg portion 76 to the feed tray 14.

Fourth Embodiment

Instead of providing the base portion 44 included in the scanner 10 according to the first embodiment, a scanner according to a fourth embodiment which is described below may have a first bottom surface 88*a* and a second bottom surface 88*b*. The configuration of a scanner 86 according to the fourth embodiment is described below with reference to FIG. 11. The same reference sign is applied to a configuration similar to that in the first embodiment.

An apparatus body 88 of the scanner 86 has the first bottom surface 88*a* that is supported by the mount surface G in the first posture (normal feed posture), and the second bottom surface 88*b* that is supported by the mount surface G in the second posture (horizontal feed posture).

In the upper figure in FIG. 11, the scanner 86 is in the first posture, and the first bottom surface 88*a* is supported by the mount surface G. As shown in the lower figure in FIG. 11, the apparatus body 88 is rotated clockwise in the lower figure in FIG. 11 from this state, and hence the second bottom surface 88*b* is brought into contact with the mount surface G. Thus, the bottom surface of the apparatus body 88 supported by the mount surface G is switched from the first bottom surface 88*a* to the second bottom surface 88*b*. That is, the switching from the first posture to the second posture is performed in the apparatus body 88.

The feed tray 14 and the output tray 16 are rotated respectively around the rotating shafts 14*b* and 16*a* as the rotation axes with the switching of the posture of the apparatus body 88, and hence the feed tray 14 is switched from the first posture to the second posture and the output tray 16 is switched from the first output posture to the second output posture. The thick lines with reference signs P7 and P8 in the upper and lower figures in FIG. 11 indicate feed paths for media when the scanner 86 is in the first posture and the second posture.

Fifth Embodiment

The above-described base portion 44 included in the scanner 10 according to the first embodiment may be replaced with a stand member 94 according to a fifth embodiment which is described below. The configuration of a scanner 90 according to the fifth embodiment is described below with reference to FIG. 12. The same reference sign is applied to a configuration similar to that in the first embodiment.

The scanner 90 according to this embodiment includes an apparatus body 92, a feed tray 14, and an output tray 16. The feed tray 14 is rotatable relative to the apparatus body 92 around a rotating shaft 14*b* serving as a rotation axis like the first embodiment. The output tray 16 is also rotatable relative to the apparatus body 92 around a rotating shaft 16*a* serving as a rotation axis like the first embodiment.

The upper figure in FIG. 12 indicates the first posture of the scanner 90. In this state, the feed tray 14 is in the first posture, and the output tray 16 is in the first output posture. As shown in the lower figure in FIG. 12, when the scanner 90 according to this embodiment is in the second posture, it is presupposed that the scanner 90 is used while the scanner 90 is attached to the stand member 94. The solid line with reference sign P9 in the upper figure in FIG. 12 indicates a feed path for a medium when the scanner 90 is in the first posture (normal feed posture). The solid line with reference sign P10 in the lower figure in FIG. 12 indicates a feed path for a medium when the scanner 90 is in the second posture (horizontal feed posture).

In the lower figure in FIG. 12, the stand member 94 includes an apparatus-body attachment portion 94*a*, a feed-tray support portion 94*b*, and an output-tray support portion 94*c*. In the lower figure in FIG. 12, although not shown, the stand member 94 is mounted on the mount surface G.

In this embodiment, the apparatus-body attachment portion 94*a* of the stand member 94 allows the apparatus body 92 to be attached in the second posture. In this embodiment, when the feed tray 14 in the first posture is rotated to a position at which the feed tray 14 comes into contact with the feed-tray support portion 94*b* of the stand member 94 while the apparatus body 92 is attached to the apparatus-body attachment portion 94*a*, the feed tray 14 is switched to the second posture. Moreover, the feed tray 14 is supported by the feed-tray support portion 94*b* and positioned. Thus, the feed tray 14 is not unintentionally rotated from the second posture to the −Z side due to the weight of media set on the feed tray 14, and the setting and feed of the media on the feed tray 14 can be stably performed in the horizontal feed posture of the scanner 90.

When the output tray 16 in the first output posture is rotated to a position at which the output tray 16 comes into contact with the output-tray support portion 94*c* of the stand member 94 while the apparatus body 92 is attached to the apparatus-body attachment portion 94*a*, the output tray 16 is switched to the second output posture. Moreover, the output tray 16 is supported by the output-tray support portion 94*c* and positioned. Thus, the output tray 16 is not unintentionally rotated from the second output posture to the −Z side due to the weight of the tray or the weight of output media, and the number of media allowed to be stacked on the output tray 16 can be increased and stacking efficiency of the output tray 16 can be increased.

In the lower figure in FIG. 12, the two-dot chain line portion with reference sign 16 indicates the first output posture of the output tray 16, and the solid line portion with reference sign 16-1 indicates the second output posture of the output tray 16, the two-dot chain line portion with reference sign 14 indicates the first posture of the feed tray 14, and the solid line portion with reference sign 14-1 indicates the second posture of the feed tray 14.

Sixth Embodiment

The feed tray 14 included in the scanner 10 according to the first embodiment may be replaced with a tray attachment portion and a plurality of types of feed trays that each can be attached to the tray attachment portion according to a sixth embodiment which is described later. The configuration of a scanner 96 according to the sixth embodiment is described below with reference to FIGS. 13 to 18. The same reference sign is applied to a configuration similar to that in the first embodiment. The scanner 96 according to this embodiment constitutes an image reading system 97, together with a plurality of feed trays 106, 110, and 112, which are examples described later.

In this embodiment, an apparatus body 98 of the scanner 96 has a tray attachment portion 98a. The tray attachment portion 98a according to this embodiment allows one of a plurality of types of feed trays to be attached thereto in accordance with the posture of the apparatus body 98. In this embodiment, for example, an insertion portion of one of the plurality of types of feed trays is inserted into the tray attachment portion 98a and hence is attached to the apparatus body 98. Alternatively, the feed tray may be detachably attached to the apparatus body 98 by another method.

In the upper figure in FIG. 13, the first-posture feed tray 106 is attached to the apparatus body 98 in the first posture. In this embodiment, the tray attachment portion 98a is provided at an end portion on the −Y side of the apparatus body 98, and is open to the −Y side. The first-posture feed tray 106 has an insertion portion 106a at a distal end portion thereof. The insertion portion 106a is inserted into the tray attachment portion 98a. The first-posture feed tray 106 is detachably attached to the apparatus body 98 because the insertion portion 106a is inserted into and attached to the tray attachment portion 98a. Note that the first-posture feed tray 106 is attached to the apparatus body 98, at a first tilt angle 81 with respect to the mount surface G.

In the lower figure in FIG. 13, the first-posture feed tray 106 is detached and then the apparatus body 98 is attached to a stand member 108 in the second posture. In this embodiment, the stand member 108 includes an apparatus-body attachment portion 108a and an output-tray support portion 108b. Although not shown in the lower figure in FIG. 13 and the upper and lower figures in FIG. 14, the stand member 108 is mounted on the mount surface G. In the lower figure in FIG. 13, the output tray 16 is supported by the output-tray support portion 108b while the rotating shaft 16a serves as the rotation axis, and is in the second output posture.

In the upper figure in FIG. 14, the second-posture feed tray 110 is detachably attached to the apparatus body 98. The second-posture feed tray 110 has an insertion portion 110a at a distal end portion thereof. The insertion portion 110a is inserted into the tray attachment portion 98a. The second-posture feed tray 110 is detachably attached to the apparatus body 98 because the insertion portion 110a is inserted into and attached to the tray attachment portion 98a. Note that the second-posture feed tray 110 is attached to the apparatus body 98, at a second tilt angle 82 with respect to the mount surface G.

In the lower figure in FIG. 14, the long-medium feed tray 112 is detachably attached to the apparatus body 98. The long-medium feed tray 112 has an insertion portion 112a at a distal end portion thereof. The insertion portion 112a is inserted into the tray attachment portion 98a. The long-medium feed tray 112 is detachably attached to the apparatus body 98 because the insertion portion 112a is inserted into and attached to the tray attachment portion 98a.

By attaching the long-medium feed tray 112 in a state tilted downward toward the mount surface G, a long medium can be guided from a position further close to the mount surface G. Further, as described above in the first embodiment, a frictional force that is generated between the long-medium feed tray 112 and the long medium is decreased, the medium can be smoothly fed, and the medium is not damaged.

With the scanner 96 according to this embodiment, for example, one of the first-posture feed tray 106, the second-posture feed tray 110, and the long-medium feed tray 112 can be selectively attached to the tray attachment portion 98a of the apparatus body 98, in accordance with the change in posture of the apparatus body 98 with respect to the mount surface G on which the apparatus body 98 is mounted or the stand member 108.

In this embodiment, as shown in the upper figure in FIG. 13 and the upper and lower figures in FIG. 14, the angles formed between the apparatus body 98 and the plurality of types of feed trays, for example, the first-posture feed tray 106, the second-posture feed tray 110, and the long-medium feed tray 112 that each are attached to the tray attachment portion 98a differ from one another.

Summarizing the above description, the scanner 96 includes the apparatus body 98 having the image reading section 34 that reads a medium; and the feed trays 106, 110, and 112 that each are provided at the apparatus body 98 and that each support the medium set thereon. The apparatus body 98 has the tray attachment portion 98a that allows each of the feed trays 106, 110, and 112 to be attached thereto. One of the feed trays 106, 110, and 112 of the plurality of types with the different forms can be selected in accordance with the change in posture of the apparatus body 98 with respect to the mount surface G on which the apparatus body 98 is mounted.

The image reading system 97 includes the scanner 96 having the tray attachment portion 98a that allows each of the feed trays 106, 110, and 112 that each support a medium set thereon to be attached to and detached from the apparatus body 98 having the image reading section 34 that reads the medium; and the plurality of feed trays 106, 110, and 112 with the different forms each of which can be attached to and detachable from the tray attachment portion 98a. One of the feed trays 106, 110, and 112 of the plurality of types can be selected in accordance with the change in posture of the apparatus body 98 with respect to the mount surface G on which the apparatus body 98 is mounted.

With the configurations of the image reading system 97 and the scanner 96 according to this embodiment, one of the plurality of types of feed trays with the different forms, for example, one of the feed trays 106, 110, and 112 can be selected in accordance with the change in posture of the apparatus body 98 with respect to the mount surface G on which the apparatus body 98 is mounted. Thus, the needs of the user of setting a medium on the feed tray can be more flexibly satisfied.

The plurality of feed trays 106, 110, and 112 with the different forms have the different tilt angles with respect to the apparatus body 98. With this configuration, when the needs of the user who sets a medium on one of the feed trays 106, 110, and 112 are a change in posture of the feed tray, this configuration satisfies the needs.

Modification of Second-Posture Feed Tray

Next, modifications of the second-posture feed tray are described with reference to FIGS. 15 to 18. In each drawing, illustration of the mount surface G and the stand member 108 is omitted.

(1) A feed tray 114 in FIG. 15 has, for example, a flat support surface 114a without protrusions and depressions that supports a medium. Thus, with the scanner 96 in the second posture (horizontal feed posture), a medium P is not hooked to the feed tray 114 and is smoothly fed when the medium P is set on the feed tray 114, or when the medium P is fed from the feed tray 114.

In this modification, the plurality of feed trays with the different forms include the feed tray 114 having the flat support surface 114*a* that supports a medium. With this configuration, a medium is not hooked to the feed tray 114 when the medium is set on the feed tray 114.

(2) A feed tray 116 in FIG. 16 has a support surface 116*a* not provided with a pair of edge guides 120 (FIG. 17) that are movable in the X-axis direction and that guide the side edges of a medium supported on the support surface 116*a*. Thus, a medium is not hooked to the edge guides when the medium is set on the feed tray 116. In addition, when a medium is set on the feed tray 116, if the edge guides 120 are located at positions where the edge guides 120 disturb setting of the medium, the edge guides 120 have to be moved to positions where the edge guides 120 do not disturb setting of the medium, thereby decreasing workability. In this modification, since the edge guides 120 are not provided, the workability is not decreased.

In this modification, the plurality of feed trays with the different forms include the feed tray 116 not provided with the edge guides 120 that guide the side edges of a medium P set on the feed tray 116. With this configuration, a medium is not hooked to the edge guides 120 when the medium is set on the feed tray 116.

(3) A feed tray 118 in FIG. 17 has a support surface 118*a* that allows a pair of edge guides 120 to be attached to and detached from the support surface 118*a*. In the upper figure in FIG. 17, the pair of edge guides 120 are attached to the feed tray 118. In this state, the pair of edge guides 120 are movable in the X-axis direction along the support surface 118*a*. The lower figure in FIG. 17 shows a state in which the pair of edge guides 120 are detached from the feed tray 118. In this modification, since the pair of edge guides 120 are attachable to and detachable from the feed tray 118, when a medium is set on the feed tray 118 or when a medium is fed from the feed tray 118, the pair of edge guides 120 can be attached to and detached from the feed tray 118 as required, thereby increasing convenience of the feed tray 118.

(4) A feed tray 122 in FIG. 18 includes a pair of edge guides 124. The edge guides 124 each include a guide portion 124*a* and a rotating shaft 124*b*. The guide portions 124*a* each are rotatable relative to the feed tray 122 around the rotating shaft 124*b* as a rotation axis. In this modification, the guide portions 124*a* can be switched between a first state (solid line portion in FIG. 18) in which the guide portions 124*a* restrict the side edges of a medium supported by a support surface 122*a* of the feed tray 122, and a second state (two-dot chain line portion with reference sign 124*a*-1 in FIG. 18) in which the protruding amounts of the guide portions 124*a* from the support surface 122*a* are decreased.

In this modification, since the guide portions 124*a* are located on the −Z side with respect to the support surface 122*a* in a case where the guide portions 124*a* are in the second state, when a medium is set on the feed tray 122 or when a medium is fed from the feed tray 122 while the edge guides 124 are not used, the medium is not hooked to the edge guides 124.

The plurality of feed trays with the different forms include the feed tray 122 provided with the edge guides 124 that guide the side edges of a medium P set thereon. The guide portions 124*a* that constitute the edge guides 124 and that restrict the side edges of the medium P can be switched between the first state in which the guide portions 124*a* restrict the side edges, and the second state in which the guide portions 124*a* fall from the first state and the protruding amounts of the guide portions 124*a* from the support surface 122*a* that supports the medium are decreased. With this configuration, when a medium P is set on the feed tray 122, the medium is not hooked to the edge guides 124.

Seventh Embodiment

The above-described feed tray 14 included in the scanner 10 according to the first embodiment may include a tray posture detector 132 according to a seventh embodiment which is described below. The configuration of a scanner 126 according to the seventh embodiment is described below with reference to FIGS. 19 to 21. The same reference sign is applied to a configuration similar to that in the first embodiment.

The scanner 126 according to this embodiment includes an apparatus body 128, a feed tray 130, and an output tray 16. Also in this embodiment, the output tray 16 is rotatable around a rotating shaft 16*a* as a rotation axis, and can be switched between a first output posture (posture with reference sign 16 in the upper figure in FIG. 19) and a second output posture (posture with reference sign 16-1 in the lower figure in FIG. 19).

In this embodiment, the feed tray 130 is rotatable around a rotating shaft 130*a* as a rotation axis, and can be switched between a first posture (posture with reference sign 130 in the upper figure in FIG. 19) and a second posture (posture with reference sign 130-1 in the lower figure in FIG. 19).

The feed tray 130 is provided with the tray posture detector 132. In this embodiment, the tray posture detector 132 is, for example, a tilt sensor or an acceleration detection sensor. When the feed tray 130 is rotated around the rotating shaft 130*a* as the rotation axis, the tray posture detector 132 detects a change in posture of the feed tray 130. For example, the tray posture detector 132 detects the tilt angle of the feed tray 130 with respect to the mount surface G. Thus, the controller 42 determines whether the feed tray 130 is in the first posture or the second posture.

In this embodiment, the controller 42 (FIG. 2) performs at least one of control on the pressing force of the separation roller 30 against the feed roller 28 (described later) and control on the separation load of the separation roller 30 based on posture detection information on the feed tray 130 from the tray posture detector 132.

The scanner 126 includes the tray posture detector 132 that detects the posture of the feed tray 130 with respect to the mount surface G. The controller 42 changes the feed conditions when a medium P is fed from the feed tray 130 based on the detection information from the tray posture detector 132. With this configuration, by setting the feed conditions suitable for the posture of the feed tray 130, proper feed can be performed.

Control on Pressing Force of Separation Roller 30 Against Feed Roller 28

The control on the pressing force of the separation roller 30 against the feed roller 28 is described with reference to FIG. 20. The apparatus body 128 according to this embodiment is provided with a pressing portion 134 therein. The pressing portion 134 includes a pressing member 136, an engagement member 138, and a cam member 140. The pressing member 136 is, for example, a coil spring.

One end of the pressing member 136 is engaged with the rotating shaft 30*a* of the separation roller 30, and the other end thereof is engaged with the engagement member 138. The engagement member 138 is engaged with the cam member 140. In this embodiment, the cam member 140 is rotationally driven by a driving source (not shown) provided in the apparatus body 128. Note that the driving source (not shown) is controlled by the controller 42, and the cam member 140 is controlled by the controller 42 via the driving source (not shown). In this embodiment, the pressing member 136 presses the separation roller 30 against the feed roller 28 via the rotating shaft 30a.

When the controller 42 determines that the feed tray 130 is in the first posture based on the detection information from the tray posture detector 132, the controller 42 brings the cam member 140 into a first state (upper figure in FIG. 20). In this state, the pressing member 136 presses the rotating shaft 30a with a first pressing force F1. That is, the separation roller 30 presses the feed roller 28 with the first pressing force F1.

In contrast, when the controller 42 determines that the feed tray 130 is in the second posture based on the detection information from the tray posture detector 132, the controller 42 rotationally drives the cam member 140 by using the driving source (not shown), and switches the cam member 140 from the first state (upper figure in FIG. 20) to a second state (lower figure in FIG. 20). In this state, the pressing member 136 is compressed between the rotating shaft 30a and the engagement member 138. Consequently, the pressing member 136 presses the rotating shaft 30a with a second pressing force F2 that is larger than the first pressing force F1. That is, the separation roller 30 presses the feed roller 28 with the second pressing force F2 that is larger than the first pressing force F1.

In this embodiment, the controller 42 adjusts the pressing force of the separation roller 30 against the feed roller 28 based on the detection information from the tray posture detector 132. In this case, with the scanner 126 according to this embodiment, when a medium is fed in the second posture (horizontal feed posture), the back tension of the medium is increased by the weight of the medium. Consequently, the feed force for feeding the medium is decreased, and non-feed of the medium may occur. In this embodiment, when the apparatus body 128 and the feed tray 130 are in the second posture (horizontal feed posture), the pressing force F2 of the separation roller 30 against the feed roller 28 is larger than the pressing force F1 in the first posture, and hence the decrease in the feed force for feeding the medium can be suppressed, and non-feed of the medium can be suppressed.

The scanner 126 includes the feed roller 28 that sends a medium P from the feed tray 130; the separation roller 30 that separates the medium P by nipping the medium P between the separation roller 30 and the feed roller 28; and the pressing portion 134 that can adjust the pressing force by which the separation roller 30 is pressed against the feed roller 28. The feed conditions include the magnitude of the pressing force, and the controller 42 adjusts the pressing force of the pressing portion 134 based on the detection information from the tray posture detector 132. With this configuration, by setting the pressing force to the magnitude suitable for the posture of the feed tray 130, proper feed can be performed.

Control on Separation Load of Separation Roller 30

Referring to FIG. 21, the control on the separation load of the separation roller 30 is described. In this embodiment, a torque limiter 142 serving as "a rotation-resistance applying portion" is provided on the rotating shaft 30a of the separation roller 30. The torque limiter 142 includes a coil spring 144, and gears 146A and 146B.

In this embodiment, the rotating shaft 30a of the separation roller 30 is inserted into the coil spring 144 of the torque limiter 142. On end portion 144a of the coil spring 144 is engaged with the gear 146A. The gear 146A and the gear 146B are meshed with each other, and the gear 146B is rotationally driven by a driving unit (not shown).

The upper figure in FIG. 21 shows the state of the torque limiter 142 when the feed tray 130 is in the first posture. When the controller 42 determines that the feed tray 130 is in the first posture based on the detection information from the tray posture detector 132, the controller 42 rotates the gear 146A and the gear 146B by using the driving unit (not shown), and hence sets the inner diameter of the coil spring 144 to a diameter d1. Thus, the coil spring 144 applies a predetermined tightening force against the rotating shaft 30a (rotation resistance against the rotating shaft 30a) of the separation roller 30.

In contrast, as shown in the lower figure in FIG. 21, when the controller 42 determines that the feed tray 130 is in the second posture based on the detection information from the tray posture detector 132, the controller 42 rotates the gear 146A and the gear 146B by using the driving unit (not shown), and hence sets the inner diameter of the coil spring 144 to a diameter d2 that is larger than the diameter d1. Thus, the tightening force (rotation resistance) by the coil spring 144 against the rotating shaft 30a of the separation roller 30 can be smaller than the tightening force (rotation resistance) in the first posture. Consequently, in the second posture of the feed tray 130, the separation load that acts between the feed roller 28 and the separation roller 30 can be smaller than the separation load in the first posture of the feed tray 130, and hence non-feed of a medium can be suppressed.

In this embodiment, the controller 42 uses, for example, the magnitude of the tightening force (rotation resistance) by the torque limiter 142, as a feed condition of a medium, and adjusts the rotation resistance by the torque limiter 142 (tightening force by the coil spring 144) based on the detection information from the tray posture detector 132.

The scanner 126 includes the feed roller 28 that sends a medium P from the feed tray 130; the separation roller 30 that separates the medium P by nipping the medium P between the separation roller 30 and the feed roller 28; and the torque limiter 142 that applies a rotation resistance to the separation roller 30. The torque limiter 142 can adjust the rotation resistance. The feed conditions include the magnitude of the rotation resistance. The controller 42 adjusts the rotation resistance by the torque limiter 142 based on the detection information from the tray posture detector 132.

With the configuration, since the feed conditions include the magnitude of the rotation resistance, and the controller 42 adjusts the rotation resistance by the torque limiter 142 based on the detection information from the tray posture detector 132, proper feed can be provided by setting the rotation resistance to the magnitude suitable for the posture of the feed tray 130.

Eighth Embodiment

The above-described base portion 44 included in the scanner 10 according to the first embodiment may be replaced with a posture adjustment base 152 according to an eighth embodiment which is described below. The configuration of a scanner 148 according to the eighth embodiment is described below with reference to FIG. 22. Note that the XYZ coordinate axes in FIG. 22 are not based on the scanner 148, and are based on the mount surface G and the posture adjustment base 152. The X-axis direction indicates an apparatus-width direction, the Y-axis direction indicates an apparatus-depth direction, and the Z-axis direction indicates an apparatus-height direction (vertical direction). In the following description, the same reference sign is applied to a configuration similar to that in the first embodiment.

The scanner 148 according to this embodiment includes an apparatus body 150, a feed tray 14, and an output tray 16. The feed tray 14 and the output tray 16 are rotatable relative to the apparatus body 150 like the first embodiment. In this embodiment, the apparatus body 150 is attached to the posture adjustment base 152. The posture adjustment base 152 is mounted on the mount surface G. In this embodiment, the X axis in the apparatus-width direction is set to a first axis, the Z axis in the vertical direction is set to a second axis, and the Y axis orthogonal to the first axis and the second axis is set to a third axis.

The posture adjustment base 152 includes a first-axis adjustment portion 152a that rotates the apparatus body 150 around the first axis (by desirable rotation angle θX), and hence adjusts the posture of the apparatus body 150 around the first axis; a third-axis adjustment portion 152b that rotates the apparatus body 150 and the first-axis adjustment portion 152a around the third axis (by desirable rotation angle θY), and hence adjusts the posture of the apparatus body 150 around the third axis; and a second-axis adjustment portion 152c that rotates the apparatus body 150, the first-axis adjustment portion 152a, and the third-axis adjustment portion 152b around the second axis (by desirable rotation angle θZ), and hence adjusts the posture of the apparatus body 150 around the second axis.

In this embodiment, not only the apparatus body 150 is switched (rotated around the first axis) from the first posture (normal feed posture) to the second posture (horizontal feed posture), but also the apparatus body 150 can be rotated also around the second axis and the third axis. Thus, the posture of the scanner 148 can be optimal for the work of the user. Note that arrows around the respective axes in FIG. 22 indicate rotational directions.

Summarizing the above description, the apparatus body 150 can perform, in addition to the switching of the posture with the rotation of the apparatus body 150 around the first axis (X axis) along the medium-width direction which is the direction intersecting with the feed direction of a medium P, at least one of the switching of the posture with the rotation of the apparatus body 150 around the second axis (Z axis) along the vertical direction, and the switching of the posture with the rotation of the apparatus body 150 around the third axis (Y axis) orthogonal to both the first axis and the second axis. With this configuration, the user can bring the apparatus body 150 and consequently the scanner 148 into the apparatus posture that allows the user to easily perform operation, thereby further increasing usability.

Ninth Embodiment

In addition to the above-described base portion 44 included in the scanner 10 according to the first embodiment, a height adjuster 158 according to a ninth embodiment which is described below may be provided. The configuration of a scanner 154 according to the ninth embodiment is described below with reference to FIG. 23. In the following description, the same reference sign is applied to a configuration similar to that in the first embodiment.

In this embodiment, an apparatus body 156 of the scanner 154 is rotatably supported by a base portion 44. The height adjuster 158 is provided on the −Z side of the base portion 44. The height adjuster 158 is, for example, a Z-axis stage, and includes a stage portion 158a, a plurality of link members 158b, and a handle 158c. The apparatus body 156 and the base portion 44 are mounted on the stage portion 158a. In this embodiment, the upper figure in FIG. 23 shows a lowered state (jacked down state) of the height adjuster 158.

In the upper figure in FIG. 23, by rotating the handle 158c, the plurality of link members 158b are displaced, and the stage portion 158a is lifted. Thus, the apparatus body 156 and the base portion 44 are lifted to the +Z side by the stage portion 158a, and is brought into a lifted state (jacked up state) of the height adjuster 158 shown in the lower figure in FIG. 23.

In this embodiment, since the height of the stage portion 158a can be adjusted in accordance with the rotation amount of the handle 158c, the scanner 154 can be set to a desirable height position, and the scanner 154 can be set to a height that allows the user to easily perform operation.

The apparatus body 156 can adjust the height with respect to the mount surface G in the vertical direction. With this configuration, since the apparatus body 156 includes the height adjuster 158 that can adjust the height with respect to the mount surface G in the vertical direction, the apparatus height can be set to a height that allows the user to easily perform operation, thereby further increasing usability.

Modification of Ninth Embodiment

In this embodiment, the height adjuster 158 that vertically moves with the link mechanism is provided on the −Z side of the base portion 44. However, instead of this configuration, screw members (for example, screws or bolts) may be provided at four corners of the base portion 44 or a support plate (not shown) that supports the base portion 44. The base portion 44 or the support plate may be vertically moved by rotating the screw members, and hence the scanner 154 may be adjusted to a desirable height.

Tenth Embodiment

The above-described user interface portion 22 included in the scanner 10 according to the first embodiment may be replaced with a tilt panel 164 according to a tenth embodiment which is described below. The configuration of a scanner 160 according to the tenth embodiment is described below with reference to FIGS. 24 and 25. In the following description, the same reference sign is applied to a configuration similar to that in the first embodiment.

The scanner 160 according to this embodiment includes an apparatus body 162, a feed tray 14, an output tray 16, a base portion 44, the tilt panel 164, and a tilt-panel posture adjuster 166. The feed tray 14 and the output tray 16 are rotatable relative to the apparatus body 150 like the first embodiment.

Referring to FIGS. 24 and 25, a recessed tilt-panel housing portion 162a is formed on the front surface side of the apparatus body 162. The tilt-panel housing portion 162a can house the tilt panel 164, and the tilt-panel posture adjuster 166. FIG. 24 shows a state in which the tilt panel 164 is raised up to the +Y side by the tilt-panel posture adjuster 166 from a state (not shown) in which the tilt panel 164 and the tilt-panel posture adjuster 166 are housed in the tilt-panel housing portion 162a.

In this embodiment, the tilt panel 164 is attached to the tilt-panel posture adjuster 166 via a rotating shaft 164a. The tilt panel 164 is rotatable in a direction with arrow R1 shown in FIG. 24 around the rotating shaft 164a as a rotation axis. Further, the tilt-panel posture adjuster 166 includes a plurality of rotating shafts (not shown). For example, the tilt-panel posture adjuster 166 is rotatable in directions with arrows R2 and R3 shown in FIGS. 24 and 25 relative to the apparatus body 162.

Referring to FIG. 24, in the state in which the tilt panel 164 is raised up from the tilt-panel housing portion 162a, by rotating the tilt panel 164 relative to the tilt-panel posture adjuster 166, the tilt panel 164 can be set to an angle at which the user can easily view the tilt panel 164.

Referring to FIG. 25, the apparatus body 162 and the feed tray 14 are in the second posture, and the output tray 16 is also in the second output posture. Even in this state, by raising up the tilt panel 164 from the tilt-panel housing portion 162a along the direction with arrow R3 and rotating the tilt-panel posture adjuster 166 around the axis line (direction with arrow R2) in the vertical direction of the mount surface G, for example, the scanner 160 can be operated even when the user is located on the −X side of the apparatus body 162, and convenience of the scanner 160 can be increased. Moreover, by properly adjusting the postures of the tilt panel 164 and the tilt-panel posture adjuster 166, visibility of the tilt panel 164 from the user can be increased.

The apparatus body 162 includes the tilt panel 164 that can be tilted. With this configuration, even when the posture of the apparatus body 162 is switched, the visibility of the tilt panel 164 can be ensured.

Eleventh Embodiment

The scanner 10 according to the first embodiment may include a first light-shielding member 172 and a second light-shielding member 174 according to an eleventh embodiment which is described below. The configuration of a scanner 168 according to the eleventh embodiment is described below with reference to FIGS. 26 and 27. In the following description, the same reference sign is applied to a configuration similar to that in the first embodiment.

In the upper figure in FIG. 26, reference sign LR1 denotes an entry range of light entering an apparatus body 170 through a feed port 27, and reference sign LR2 denotes an entry range of light entering the apparatus body 170 through an output port 24. In this case, as shown in the lower figure in FIG. 26, when the apparatus body 170 is switched from the first posture to the second posture, when the feed tray 14 is switched from the first posture to the second posture, and when the output tray 16 is switched from the first output posture to the second output posture, the entry range of light entering the apparatus body 170 is expanded. Note that reference sign LR3 denotes an entry range of light expanded on the side of the feed tray 14, and reference sign LR4 denotes an entry range of light expanded on the side of the output tray 16.

When the entry range of light entering the apparatus body 170 is expanded, the light entering the apparatus body 170 reaches the image reading section 34, image reading quality by the image reading section 34 may be decreased, and the reading result of a medium may be degraded.

Referring to FIG. 27, the apparatus body 170 includes the first light-shielding member 172 and the second light-shielding member 174. In this embodiment, the first light-shielding member 172 is provided at a position corresponding to the feed port 27. The first light-shielding member 172 can be switched between a housed state (upper figure in FIG. 27) housed in the apparatus body 170, and a protruding state protruding from the apparatus body 170, in association with the switching between the first posture and the second posture of the feed tray 14, by using an association portion 176 (FIG. 28, described later).

In the lower figure in FIG. 27, when the first light-shielding member 172 protrudes from the apparatus body 170, at least part of the first light-shielding member 172 enters the entry range LR1 of light, blocks part of light entering the apparatus body 170, and decreases the amount of light entering the apparatus body 170. Note that a range with reference sign LC1 in the lower figure in FIG. 27 is a restriction range in which the entry of light into the apparatus body 170 is blocked by the first light-shielding member 172.

In this embodiment, the second light-shielding member 174 is provided at a position corresponding to the output port 24. The second light-shielding member 174 can be switched between a housed state (upper figure in FIG. 27) housed in the apparatus body 170, and a protruding state protruding from the apparatus body 170, in association with the switching between the first output posture and the second output posture of the output tray 16, by using an association portion (not shown).

In the lower figure in FIG. 27, when the second light-shielding member 174 protrudes from the apparatus body 170, at least part of the second light-shielding member 174 enters the entry range LR2 of light, blocks part of light entering the apparatus body 170, and decreases the amount of light entering the apparatus body 170. Note that a range with reference sign LC2 in the lower figure in FIG. 27 is a restriction range in which the entry of light into the apparatus body 170 is blocked by the second light-shielding member 174.

Thus, since the amount of light entering the apparatus body 170 through the feed port 27 and the output port 24 can be decreased by the first light-shielding member 172 and the second light-shielding member 174, the decrease in image reading quality by the image reading section 34 can be suppressed, and the degradation in the reading result of a medium can be suppressed.

As shown in FIG. 28, the association portion 176 according to this embodiment includes a gear 178, a gear 180A, a gear 180B, an endless belt 182, and a rack 172a provided on the first light-shielding member 172. The gear 178 is coaxially provided with the rotating shaft 14b of the feed tray 14, and rotates together with the rotating shaft 14b in the same direction. The gear 180A and the gear 180B are constituted as a compound gear. The endless belt 182 is wound around the gear 178 and the gear 180A. The gear 180B and the rack 172a are meshed with each other, and form rack and pinion.

In the upper figure in FIG. 28, when the feed tray 14 is in the first posture, the first light-shielding member 172 is in the housed state. As shown in the lower figure in FIG. 28, when the feed tray 14 is switched from the first posture to the second posture, the rotating shaft 14b rotates in a direction with an arrow in the lower figure in FIG. 28. Thus, the gear 178 rotates together with the rotating shaft 14b. The rotation of the gear 178 is transmitted to the gears 180A and 180B that constitute a compound gear by using the endless belt 182. Consequently, the gear 180B rotates, and the first light-shielding member 172 is switched from the housed state to the protruding state via the rack 172a. Note that when the feed tray 14 is switched from the second posture to the first posture, the first light-shielding member 172 is switched from the protruding state to the housed state by the association portion 176. Although not shown, the second light-shielding member 174 also has a similar association portion, and is associated with the rotation operation of the output tray 16.

The scanner 168 includes the output tray 16 that receives a medium P which is output thereon; the feed port 27 that is of the apparatus body 170 and into which the medium P set on the feed tray 14 is inserted; the output port 24 that is of the apparatus body 170 and from which the medium P is output to the output tray 16; the first light-shielding member 172 that can be switched between the protruding state protruding from the apparatus body 170 and the housed state housed in the apparatus body 170, and that, in the protruding state, decreases the amount of light entering the apparatus body 170 via the feed port 27; and the second light-shielding member 174 that can be switched between the protruding state protruding from the apparatus body 170 and the housed state housed in the apparatus body 170, and that, in the protruding state, decreases the amount of light entering the apparatus body 170 via the output port 24. The first light-shielding member 172 and the second light-shielding member 174 are switched between the protruding state and the housed state in accordance with the switching of the posture of the apparatus body 170 with respect to the mount surface G.

With the above-described configuration, the scanner 168 includes the first light-shielding member 172 that decreases the amount of light entering the apparatus body 170 via the feed port 27; and the second light-shielding member 174 that decreases the amount of light entering the apparatus body 170 via the output port 24. The first light-shielding member 172 and the second light-shielding member 174 are switched between the protruding state and the housed state in accordance with the switching of the posture of the apparatus body 170 with respect to the mount surface G. Thus, the degradation in the reading result due to the influence of light entering the apparatus body 170 via the feed port 27 or the output port 24 can be suppressed. Also, the user does not have to operate the first light-shielding member 172 and the second light-shielding member 174 in accordance with the posture of the apparatus body 170, the scanner 168 with high usability can be provided.

Modification of Eleventh Embodiment

In this embodiment, the first light-shielding member 172 and the second light-shielding member 174 are associated with the switching of the postures of the feed tray 14 and the output tray 16. However, instead of this configuration, the first light-shielding member 172 and the second light-shielding member 174 may be switched from the housed state to the protruding state when the medium feed path 26 extending from the feed tray 14 to the output tray 16 is in the horizontal posture. Specifically, when the body posture detector 46 detects that the apparatus body 170 is switched from the first posture to the second posture, the controller 42 may switch the first light-shielding member 172 and the second light-shielding member 174 from the housed state to the protruding state by a driving unit (not shown) based on detection information from the body posture detector 46.

According to another embodiment, a light-amount detection sensor that detects the light amount in the medium feed path 26 may be provided in the apparatus body 170. When the posture of the apparatus body 170 is switched from the first posture to the second posture, if the light-amount detection sensor detects an increase in the amount of light entering the apparatus body 170, the controller 42 may switch the first light-shielding member 172 and the second light-shielding member 174 from the housed state to the protruding state by a driving unit (not shown). The controller 42 may switch the first light-shielding member 172 and the second light-shielding member 174 from the protruding state to the housed state by the driving unit (not shown) when the apparatus body 170 is switched from the second posture to the first posture. Alternatively, the dedicated light-amount detection sensor may not be provided in the apparatus body 170, and at least one of the first reading unit 40A and the second reading unit 40B of the image reading section 34 may serve as the light-amount detection sensor.

The invention is not limited to the above-described embodiments, and can be modified within the scope of the invention described in the claims. It is clear that such modifications are also included in the scope of the invention.

The entire disclosure of Japanese Patent Application No. 2017-210114, filed Oct. 31, 2017, is expressly incorporated by reference herein.

What is claimed is:

1. An image reading apparatus, comprising:
an apparatus body that includes a reader that reads a medium, a posture of the apparatus body being configured to change between a first feeding posture and a second feeding posture;
a feed tray that is provided at the apparatus body and that supports the medium which is set thereon;
a feed-tray posture switching portion that switches a posture of the feed tray with respect to a mount surface and is positioned in an inside of the apparatus body;
a base portion that is attached to the apparatus body, and
a detector that is configured to detect the posture of the apparatus body,
wherein the detector has a switch that is provided on the base portion and a pressing portion that is configured to press the switch and is provided on the apparatus body, and
the pressing portion presses the switch in association with changing of the posture of the apparatus body.

2. The image reading apparatus according to claim 1, wherein the feed-tray posture switching portion switches the posture of the feed tray in association with switching of the posture of the apparatus body.

3. The image reading apparatus according to claim 1, further comprising:
a feed roller that sends the medium from the feed tray;
a separation roller that nips the medium between the separation roller and the feed roller and hence that separates the medium; and
a separation-roller displacing portion that displaces a rotation center of the separation roller around a rotation center of the feed roller.

4. The image reading apparatus according to claim 3, wherein the separation-roller displacing portion displaces the separation roller in association with switching the posture of the apparatus body.

5. An image reading system, comprising:
an image reading apparatus including a single tray attachment portion that allows a feed tray that supports a medium which is set thereon to be attachable to and detachable from an apparatus body including a reader that reads the medium; and
a plurality of feed trays that have different forms, each of the feed trays being attachable to and detachable from the single tray attachment portion, having an insertion portion that is mounted to the tray attachment portion to position the feed tray, and forming a different tilt angle with respect to the apparatus body,
wherein when the apparatus body is upright with respect to a mount surface, a first one of the plurality of feed trays has a tilt angle that extends upward with respect to the single tray attachment portion, and wherein when the apparatus body is attached to a base member to thereby change a posture of the apparatus body, a second one of the plurality of feed trays has a tilt angle that extends horizontally with respect to the single tray attachment portion and a third one of the feed trays has a tilt angle that extends downward with respect to the single tray attachment portion.

6. The image reading system according to claim 5,
wherein the plurality of feed trays with the different forms include a feed tray having a flat support surface that supports the medium.

7. The image reading system according to claim 5,
wherein the plurality of feed trays with the different forms include a feed tray not provided with edge guides that guide side edges of the medium which is set on the feed tray.

8. The image reading system according to claim 5,
wherein the plurality of feed trays with the different forms include a feed tray provided with edge guides that guide side edges of the medium which is set on the feed tray, and
wherein guide portions that constitute the edge guides and that restrict the side edges are configured to be switched between a first state in which the guide portions restrict the side edges, and a second state in which the guide portions are displaced from the first state and protruding amounts of the guide portions from a support surface that supports the medium are smaller than protruding amounts of the guide portions from the support surface in the first state.

9. An image reading apparatus, comprising:
an apparatus body that includes a reader that reads a medium, a posture of the apparatus body being configured to switch between a first feeding posture and a second feeding posture;
a feed tray that is provided in the apparatus body and that supports the medium which is set thereon, a posture of the feed tray being configured to switch independently of the apparatus body when the apparatus body is in second feeding posture;
a feed-tray posture switching portion that switches the posture of the feed tray;
a base portion that is attached to the apparatus body, and
a detector that is configured to detect the posture of the apparatus body,
wherein the second feeding posture is a posture such that a medium feeding path is tilted along a horizontal direction,
wherein the detector has a switch that is provided on the base portion and a pressing portion that is configured to press the switch and is provided on the apparatus body, and
wherein the pressing portion presses the switch in association with changing of the posture of the apparatus body.

* * * * *